US009751352B2

(12) United States Patent
Yoneda et al.

(10) Patent No.: US 9,751,352 B2
(45) Date of Patent: Sep. 5, 2017

(54) HEAT-SENSITIVE RECORDING MEDIUM DISPLAYING GOLD METAL TONE, AND/OR HEAT-SENSITIVE RECORDING MEDIUM DISPLAYING TWO DIFFERENT COLOR TONES

(71) Applicant: OJI HOLDINGS CORPORATION, Tokyo (JP)

(72) Inventors: Yoshihiko Yoneda, Tokyo (JP); Chieko Oshisaka, Tokyo (JP); Takashi Takemura, Tokyo (JP); Tohru Murai, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 14/888,269

(22) PCT Filed: May 1, 2014

(86) PCT No.: PCT/JP2014/062042
§ 371 (c)(1),
(2) Date: Oct. 30, 2015

(87) PCT Pub. No.: WO2014/181745
PCT Pub. Date: Nov. 13, 2014

(65) Prior Publication Data
US 2016/0059604 A1    Mar. 3, 2016

(30) Foreign Application Priority Data

May 10, 2013  (JP) .................................. 2013-100266
May 14, 2013  (JP) .................................. 2013-101845
May 14, 2013  (JP) .................................. 2013-101864
Jun. 7, 2013   (JP) .................................. 2013-120324

(51) Int. Cl.
| B41M 5/323 | (2006.01) |
| B41M 5/41 | (2006.01) |
| C09B 57/00 | (2006.01) |
| C09B 57/10 | (2006.01) |
| B41M 5/333 | (2006.01) |
| B41M 5/34 | (2006.01) |

(52) U.S. Cl.
CPC ............. *B41M 5/41* (2013.01); *B41M 5/323* (2013.01); *B41M 5/3335* (2013.01); *B41M 5/34* (2013.01); *C09B 57/00* (2013.01); *C09B 57/10* (2013.01); *B41M 2205/04* (2013.01); *B41M 2205/22* (2013.01)

(58) Field of Classification Search
CPC .......... B41M 5/323; B41M 5/41; B41M 5/42; B41M 5/426; B41M 2205/04; B41M 2205/22; B41M 2205/38
USPC ........... 503/200, 204, 218; 50/200, 204, 218
See application file for complete search history.

(56) References Cited

U.S. PATENT DOCUMENTS

| 4,705,775 | A | 11/1987 | Zink et al. |
| 5,409,880 | A | 4/1995 | Itabashi et al. |
| 5,490,956 | A * | 2/1996 | Kito ...................... B41M 5/305 106/493 |
| 7,560,415 | B2 * | 7/2009 | Tsuboi ................... B41M 5/305 360/69 |
| 2005/0052521 | A1 | 3/2005 | Bhatt et al. |

FOREIGN PATENT DOCUMENTS

| EP | 0659582 A1 | 6/1995 |
| JP | H02-206585 | 8/1990 |
| JP | H05-185715 | 7/1993 |
| JP | H05-193254 | 8/1993 |
| JP | H05-270126 | 10/1993 |
| JP | H06-247043 | 9/1994 |
| JP | H06-297846 | 10/1994 |
| JP | H08-11467 | 1/1996 |
| JP | H10-157289 | 6/1998 |
| JP | H10-250237 | 9/1998 |
| JP | H11-138991 A | 5/1999 |
| JP | 2000-52659 | 2/2000 |

(Continued)

OTHER PUBLICATIONS

International Search Report for International Application No. PCT/JP2014/062042 dated Jun. 10, 2014.

(Continued)

*Primary Examiner* — Bruce H Hess
(74) *Attorney, Agent, or Firm* — Kratz, Quintos & Hanson, LLP

(57) ABSTRACT

A main purpose of the present invention is to provide a heat-sensitive recording medium that utilizes a chromogenic reaction between a dye precursor and a developer, wherein a colored image is tinged with a metallic luster so as to exhibit a gold metal color tone with a vivid appearance, or to provide a heat-sensitive recording medium exhibiting a yellow or gold metal color tone and a color tone different from the yellow or gold metal color tone, wherein the color optical density in each of the color tones is high, and a recording part has excellent color separation properties.

The present invention provides a heat-sensitive recording medium comprising a heat-sensitive recording layer containing a dye precursor and a developer on a support, the dye precursor being a dye precursor which is colored to a yellow color tone, wherein: (a) the support has a metallic luster and provides a metallic luster to a surface of a base material not having a metallic luster; and/or (b) the dye precursor which is colored to a yellow color tone is a first dye precursor, and the heat-sensitive recording medium further contains a second dye precursor which is colored to a different color tone from the first dye precursor; the first dye precursor being a compound having a specific pyridine skeleton; and the second dye precursor: (b1) has a form of fine composite particles containing the second dye precursor and a polymer compound; or (b2) has a melting point of 200° C. or more.

15 Claims, No Drawings

(56) References Cited

FOREIGN PATENT DOCUMENTS

| JP | 2001-105744 A1 | 4/2001 |
| JP | 2001-353965 A | 12/2001 |
| JP | 2002-321461 A1 | 11/2002 |
| JP | 2004-195743 A1 | 7/2004 |
| JP | 2005-225222 A1 | 8/2005 |
| JP | 2008-195043 A1 | 8/2008 |
| WO | WO 2013/049229 A1 | 4/2013 |

OTHER PUBLICATIONS

Office Action dated Aug. 23, 2016 for the corresponding JP patent application No. 2013-100266, with English translation.
European Patent Application No. 14795257.6: Partial Supplementary European Search Report dated Jan. 24, 2017.
European Patent Application No. 14795257.6: Extended European Search Report dated Jun. 21, 2017.

* cited by examiner

HEAT-SENSITIVE RECORDING MEDIUM DISPLAYING GOLD METAL TONE, AND/OR HEAT-SENSITIVE RECORDING MEDIUM DISPLAYING TWO DIFFERENT COLOR TONES

TECHNICAL FIELD

The present invention relates to a heat-sensitive recording medium utilizing a chromogenic reaction between a dye precursor and a developer.

BACKGROUND

Heat-sensitive recording mediums (materials) which utilize a reaction between a dye precursor and a developer and obtain a colored image by reacting both substances by means of thermal energy are well known. Such heat-sensitive recording mediums are relatively inexpensive. And also, recording apparatuses are compact and easy to maintain. Therefore heat-sensitive recording materials are used not only as recording mediums for fax machines and/or printers, but also for a wide range of fields.

However, the required performance and quality of the heat-sensitive recording materials have been diversified in step with the expansion of applications. Therefore, for example, heat-sensitive recording mediums require an increased optical density, image stabilization, and a metallic color tone. Furthermore, a multicolor heat-sensitive recording medium which has not only a single color tone but rather a multicolor tones, wherein the each color is developed at high optical density, and a recording part (developed image) has excellent color separation properties, is required.

Further, a two-color heat-sensitive recording medium having a color tone tinged with a metallic luster such as a gold metallic tone as one of the colors can further accentuate text or graphics by taking advantage of conventionally unavailable color combinations, so there is a high demand for practical applications.

In particular, with regard to heat-sensitive recording mediums in which a colored image has a metallic color tone, whose range of application has the potential to expand, it has been proposed to form a coating layer containing a pigment, which is prepared by coating the surface of natural mica with at least one type of titanium oxide and/or iron oxide, on a heat-sensitive recording layer (see Patent Document 1) or to form a layer containing an inorganic pearl pigment on a heat-sensitive recording layer (see Patent Document 2). But such efforts have not necessarily reached the satisfied results with regard to the metallic tone, optical density, and/or image stability.

Further, a two-color heat-sensitive recording medium having a yellow color tone can further accentuate text or graphics by taking advantage of a vivid yellow color tone, so there is a high demand for practical applications.

As a multicolor heat-sensitive recording medium having a yellow color tone, it has been proposed that only a low-temperature coloring layer is developed by a low-temperature developing operation, and at the time of a high-temperature developing operation, a decolorizing agent having a decolorizing effect acts on the coloring system of the low-temperature coloring layer so as to achieve developing of only a high-temperature coloring layer (see Patent Documents 3 to 5), and that two distinguishable colors are developed by laminating two heat-sensitive recording layers which are developed in different color tones and which are provided different amounts of heat (see Patent Document 6). But such efforts have not necessarily reached the satisfied results with regard to color separation properties, optical density, and/or image stability.

PRIOR ART DOCUMENT

Patent Document

Patent Document 1: Japanese Unexamined Patent Publication No. H2-206585
Patent Document 2: Japanese Unexamined Patent Publication No. H6-297846
Patent Document 3: Japanese Unexamined Patent Publication No. H5-185715
Patent Document 4: Japanese Unexamined Patent Publication No. H5-193254
Patent Document 5: Japanese Unexamined Patent Publication No. H5-270126
Patent Document 6: Japanese Unexamined Patent Publication No. 2001-105744

SUMMARY OF THE INVENTION

Problems to be Solved by the Invention

A first problem of the present invention is to provide a heat-sensitive recording medium that develops a image with a metallic luster and a gold metal color tone with a vivid appearance as heat-sensitive recording materials utilizing a chromogenic reaction between a dye precursor and a developer. In addition, a second problem of the present invention is to provide a heat-sensitive recording medium exhibiting a yellow or gold metallic color tone and a color tone different from the yellow or gold metallic color tone, wherein the color optical density in each of the color tones is high, and a recording part has excellent color separation properties. Furthermore, it is the other problem of the present invention to provide a heat-sensitive recording material that combines the first and second problem.

Means to Solve the Problem

As a result of conducting dedicated research, the present inventors have solved the problems described above. That is, the present invention relates to the following heat-sensitive recording medium.

Item 1: A heat-sensitive recording medium comprising a heat-sensitive recording layer containing a dye precursor and a developer on a support, the dye precursor being a dye precursor which is colored to a yellow color tone, wherein:

(a) the support has a metallic luster and provides a metallic luster to a surface of a base material not having a metallic luster;

and/or (b) the dye precursor which is colored to a yellow color tone is a first dye precursor, and the heat-sensitive recording medium further contains a second dye precursor which is colored to a different color tone from the first dye precursor;

the first dye precursor being a compound having a pyridine skeleton in a molecular structure represented by the following general formula (1):

Formula 1

General formula (1)

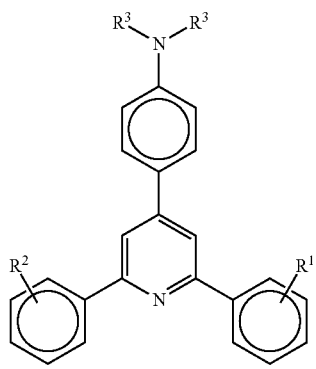

(in the formula, $R^1$ and $R^2$ are hydrogen atoms or alkoxy groups having from 1 to 8 carbon atoms, wherein $R^1$ and $R^2$ may be the same or different, and $R^3$ is an alkyl group having from 1 to 4 carbon atoms);

and the second dye precursor:

(b1) has a form of fine composite particles containing the second dye precursor and a polymer compound; or (b2) has a melting point of 200° C. or more.

Item 2: The heat-sensitive recording medium according to item 1, wherein (a) the support has a metallic luster and provides a metallic luster to a surface of a base material not having a metallic luster; and a yellow density of dynamic coloring achieved by printing on the heat-sensitive recording medium with a thermal head at an applied energy of 0.97 mJ/dot is 1.00 or more, and a static color-development starting temperature at which a color optical density achieved by bringing the heat-sensitive recording medium into contact with a hot plate of 40 to 220° C. for 5 seconds at $9.8 \times 10^4$ Pa is 0.2 is 50° C. or more.

Item 3: The heat-sensitive recording medium according to item 1 or 2, wherein (a) the support has a metallic luster and provides a metallic luster to a surface of a base material not having a metallic luster; and a content of the dye precursor which is colored to a yellow color tone is 0.7 g/m² or more.

Item 4: The heat-sensitive recording medium according to any one of items 1 to 3, wherein (a) the support has a metallic luster and provides a metallic luster to a surface of a base material not having a metallic luster; and the dye which is colored to a yellow color tone is a dye precursor having a pyridine skeleton in a molecular structure represented by the following general formula (1):

Formula 2

General formula (1)

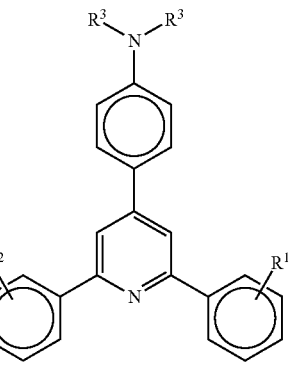

(in the formula, $R^1$ and $R^2$ are hydrogen atoms or alkoxy groups having from 1 to 8 carbon atoms and may be the same or different, and $R^3$ is an alkyl group having from 1 to 4 carbon atoms).

Item 5: The heat-sensitive recording medium according to item 1, the heat-sensitive recording medium being a two-color heat-sensitive recording medium, wherein:

(a) the support has a metallic luster and provides a metallic luster to a surface of a base material not having a metallic luster; and (b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the heat-sensitive recording layer has a multilayer structure comprising at least a first heat-sensitive recording layer and a second heat-sensitive recording layer, wherein the first dye precursor is contained in the first heat-sensitive recording layer, and at least the second dye precursor is contained in the second heat-sensitive recording layer in a form of fine composite particles.

Item 6: The heat-sensitive recording medium according to item 1 or 5, the heat-sensitive recording medium being a two-color heat-sensitive recording medium, wherein:

(a) the support has a metallic luster and provides a metallic luster to a surface of a base material not having a metallic luster; and (b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

Item 7: The heat-sensitive recording medium according to item 1, 5, or 6, the heat-sensitive recording medium being a two-color heat-sensitive recording medium, wherein:

(a) the support has a metallic luster and provides a metallic luster to a surface of a base material not having a metallic luster; and (b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and a yellow density of dynamic coloring achieved by printing on the heat-sensitive recording medium with a thermal head at an applied energy of 0.66 mJ/dot is 1.00 or more, and a yellow density of dynamic coloring achieved by printing on the heat-sensitive recording medium with a thermal head at an applied energy of 0.97 mJ/dot is 1.00 or more.

Item 8: The heat-sensitive recording medium according to item 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the heat-sensitive recording layer has a multilayer structure comprising at least a first heat-sensitive recording layer and a second heat-sensitive recording layer, wherein the first dye precursor is contained in the first heat-sensitive recording layer, and at least the second dye precursor is contained in the second heat-sensitive recording layer in a form of fine composite particles.

Item 9: The heat-sensitive recording medium according to item 1 or 8, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

Item 10: The heat-sensitive recording medium according to item 1, 8, or 9, the heat-sensitive recording medium being a two-color heat-sensitive recording medium, wherein:

(b) the dye precursor which is-colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and a yellow density of dynamic coloring achieved by printing on the two-color heat-sensitive recording medium with a thermal head at an applied energy of 0.66 mJ/dot is 1.00 or more, and a yellow density of dynamic coloring achieved by printing on the heat-sensitive recording medium with a thermal head at an applied energy of 0.97 mJ/dot is 1.00 or more.

Item 11: The heat-sensitive recording medium according to item 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and the heat-sensitive recording layer has a multilayer structure comprising at least a first heat-sensitive recording layer and a second heat-sensitive recording layer, wherein the first heat-sensitive recording layer contains the first dye precursor, and the second heat-sensitive recording layer contains the second dye precursor.

Item 12: The heat-sensitive recording medium according to item 1 or 11, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

Item 13: The heat-sensitive recording medium according to item 1, 11, or 12, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and a yellow density of dynamic coloring achieved by printing on the two-color heat-sensitive recording medium with a thermal head at an applied energy of 0.66 mJ/dot is 1.00 or more, and a yellow density of dynamic coloring achieved by printing on the heat-sensitive recording medium with a thermal head at an applied energy of 0.97 mJ/dot is 1.00 or more.

Item 14: The heat-sensitive recording medium according to any one of items 1 and 11 to 13, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and the support has a metallic luster.

Item 15: The heat-sensitive recording medium according to any one of items 1 and 11 to 14, wherein (b2) the dye precursor having a melting point of 200° C. or more is a dye precursor which is colored to a black color tone.

Item 16: The heat-sensitive recording medium according to any one of items 1 to 15, wherein the dye precursor having a pyridine skeleton in a molecular structure represented by general formula (1) is a dye precursor excluding a case in which $R^1$ and $R^2$ are simultaneously hydrogen atoms in the formula.

Item 17: A heat-sensitive recording medium comprising a heat-sensitive recording layer containing a dye precursor and a developer on a support, the support having a metallic luster, and the dye precursor being a dye precursor which is colored to a yellow color tone.

Item 18: The heat-sensitive recording medium according to item 17, wherein a dynamic color-development optical density (yellow density of dynamic coloring) achieved imaged by printing on the heat-sensitive recording medium with a thermal head at an applied energy of 0.97 mJ/dot is 1.00 or more, and a static color-development starting temperature at which a color optical density achieved by bringing the heat-sensitive recording medium into contact with a hot plate of 40 to 220° C. for 5 seconds at $9.8 \times 10^4$ Pa is 0.2 is 50° C. or more.

Item 19: The heat-sensitive recording medium according to item 17 or 18, wherein a content of the dye precursor which is colored to a yellow color tone is 0.7 g/m² or more.

Item 20: The heat-sensitive recording medium according to any one of items 17 to 19, wherein the dye precursor which is colored to a yellow color tone is a dye precursor having a pyridine represented by the following general formula (1):

Formula 3

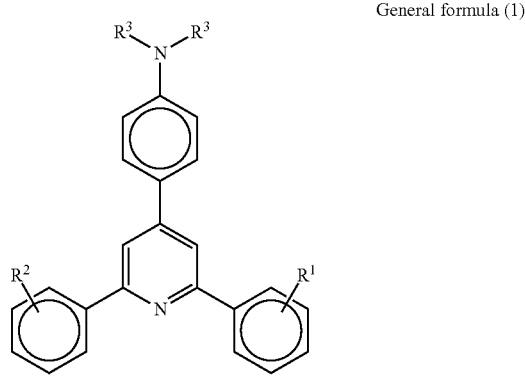

General formula (1)

(in the formula, $R^1$ and $R^2$ are hydrogen atoms or alkoxy groups having from 1 to 8 carbon atoms and may be the same or different, and $R^3$ is an alkyl group having from 1 to 4 carbon atoms).

Item 21: The heat-sensitive recording medium according to any one of items 17 to 20, wherein the support provides a metallic luster to a surface of a base material not having a metallic luster.

Item 22: A recording method for the heat-sensitive recording medium described in any one of items 1 to 4 and items 16 to 21, the method comprising the steps of: recording a developed color image of a gold metal tone at an applied energy yielding a temperature equal to or greater than a static color-development starting temperature by means of heating with a thermal head; and recording to a silver metal tone at an applied energy at which a dynamic color-development optical density (yellow density of dynamic coloring) is less than 1.00.

Item 23: A two-color heat-sensitive recording medium comprising a heat-sensitive recording layer containing a dye precursor and a developer on a support, the support having a metallic luster, and the dye precursor containing a first dye precursor having a pyridine skeleton in a molecular structure represented by the following general formula (1):

Formula 4

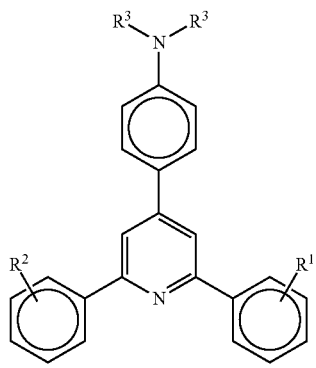

General formula (1)

(in the formula, $R^1$ and $R^2$ are hydrogen atoms or alkoxy groups having from 1 to 8 carbon atoms; $R^3$ is an alkyl group having from 1 to 4 carbon atoms; and $R^1$ and $R^2$ may be the same or different); and a second dye precursor which is colored to a different color tone from the first dye precursor, wherein at least the second dye precursor is contained in the heat-sensitive recording layer in a form of fine composite particles.

Item 24: A two-color heat-sensitive recording medium comprising a heat-sensitive recording layer containing a dye precursor and a developer on a support, the support having a metallic luster, and the dye precursor containing a first dye precursor having a pyridine skeleton in a molecular structure represented by the following general formula (1):

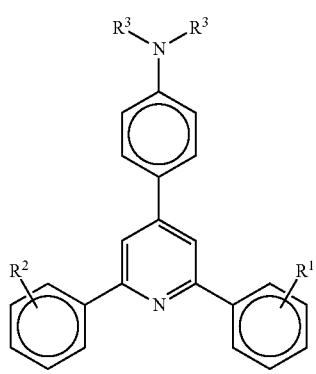

General formula (1)

(in the formula, $R^1$ and $R^2$ are hydrogen atoms or alkoxy groups having from 1 to 8 carbon atoms; $R^3$ is an alkyl group having from 1 to 4 carbon atoms; and $R^1$ and $R^2$ may be the same or different); and a second dye precursor which is colored to a different color tone from the first dye precursor, wherein the first color is a metallic color tone tinged with the metallic luster of the support due to the coloring of the first dye precursor, and the second color is a mixed color tone caused by the coloring of the first dye precursor and the second dye precursor.

Item 25: The two-color heat-sensitive recording medium according to item 23 or 24, the heat-sensitive recording layer having a multilayer structure comprising at least a first heat-sensitive recording layer and a second heat-sensitive recording layer, wherein the first dye precursor is contained in the first heat-sensitive recording layer, and at least the second dye precursor is contained in the second heat-sensitive recording layer in a form of fine composite particles.

Item 26: The two-color heat-sensitive recording medium according to any one of items 23 to 25, wherein the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

Item 27: The two-color heat-sensitive recording medium according to any one of items 23 to 26, wherein the second dye precursor is contained in the heat-sensitive recording layer in a form of fine composite particles containing the second dye precursor and a polymer compound.

Item 28: The two-color heat-sensitive recording medium according to any one of items 1, 5 to 7, 16, and 23 to 26, wherein the color tone tinged with the metallic luster of the support due to the coloring of the first dye precursor is a gold metal tone, and the mixed color tone caused by the coloring of the first dye precursor and the second dye precursor is red, black, or green.

Item 29: The heat-sensitive recording medium according to any one of items 23 to 28, wherein a dynamic color-development optical density (yellow density of dynamic coloring) achieved by printing on the heat-sensitive recording medium with a thermal head at an applied energy of 0.66 mJ/dot is 1.00 or more, and a dynamic color-development optical density (yellow density of dynamic coloring) achieved by printing on the heat-sensitive recording medium with a thermal head at an applied energy of 0.97 mJ/dot is 1.00 or more.

Item 30: A two-color heat-sensitive recording medium comprising a heat-sensitive recording layer containing a dye precursor and a developer on a support, the dye precursor containing a first dye precursor having a pyridine skeleton in a molecular structure represented by the following general formula (1):

Formula 6

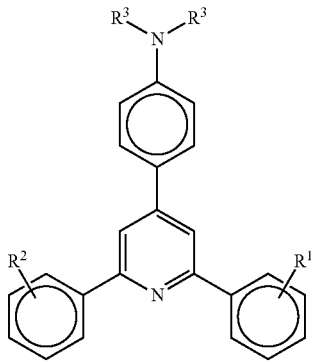

General formula (1)

(in the formula, $R^1$ and $R^2$ are hydrogen atoms or alkoxy groups having from 1 to 8 carbon atoms; $R^3$ is an alkyl group having from 1 to 4 carbon atoms; and $R^1$ and $R^2$ may be the same or different); and a second dye precursor which is colored to a different color tone from the first dye precursor, wherein at least the second dye precursor is contained in the heat-sensitive recording layer in a form of fine composite particles.

Item 31: A two-color heat-sensitive recording medium comprising a heat-sensitive recording layer containing a dye precursor and a developer on a support, the dye precursor containing a first dye precursor having a pyridine skeleton in a molecular structure represented by the following general formula (1):

Formula 7

General formula (1)

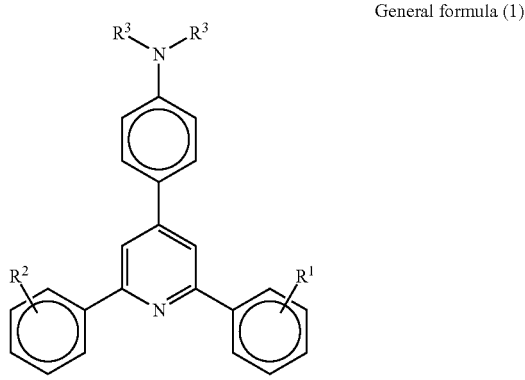

(in the formula, $R^1$ and $R^2$ are hydrogen atoms or alkoxy groups having from 1 to 8 carbon atoms; $R^3$ is an alkyl group having from 1 to 4 carbon atoms; and $R^1$ and $R^2$ may be the same or different); and a second dye precursor which is colored to a different color tone from the first dye precursor, wherein the first color is a color tone caused by the coloring of the first dye precursor, and the second color is a mixed color tone caused by the coloring of the first dye precursor and the second dye precursor.

Item 32: The two-color heat-sensitive recording medium according to item 30 or 31, the heat-sensitive recording layer having a multilayer structure comprising at least a first heat-sensitive recording layer and a second heat-sensitive recording layer, wherein the first dye precursor is contained in the first heat-sensitive recording layer, and at least the second dye precursor is contained in the second heat-sensitive recording layer in a form of fine composite particles.

Item 33: The two-color heat-sensitive recording medium according to any one of items 30 to 32, wherein the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

Item 34: The two-color heat-sensitive recording medium according to any one of items 30 to 33, wherein the second dye precursor is contained in the heat-sensitive recording layer in a form of fine composite particles containing the second dye precursor and a polymer compound.

Item 35: The two-color heat-sensitive recording medium according to any one of items 1, 8 to 10, 16, and 30 to 34, wherein the color tone caused by the coloring of the first dye precursor is yellow, and the mixed color tone caused by the coloring of the first dye precursor and the second dye precursor is red, black, or green.

Item 36: The two-color heat-sensitive recording medium according to any one of items 1, 8 to 10, 16, and 30 to 35, wherein fluorescent light is emitted under ultraviolet rays due to the coloring of the first dye precursor.

Item 37: The two-color heat-sensitive recording medium according to any one of items 30 to 36, wherein a dynamic color-development optical density (yellow density of dynamic coloring) achieved by printing on the heat-sensitive recording medium with a thermal head at an applied energy of 0.66 mJ/dot is 1.00 or more, and a dynamic color-development optical density (yellow density of dynamic coloring) achieved by printing on the heat-sensitive recording medium with a thermal head at an applied energy of 0.97 mJ/dot is 1.00 or more.

Item 38: A two-color heat-sensitive recording medium comprising a heat-sensitive recording layer containing a dye precursor and a developer on a support, the dye precursor containing a first dye precursor having a pyridine skeleton in a molecular structure represented by the following general formula (1):

Formula 8

General formula (1)

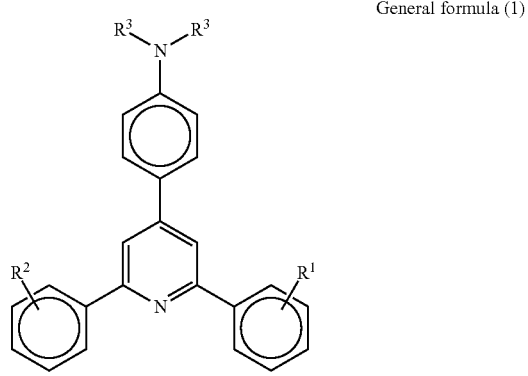

(in the formula, $R^1$ and $R^2$ are hydrogen atoms or alkoxy groups having from 1 to 8 carbon atoms; $R^3$ is an alkyl group having from 1 to 4 carbon atoms; and $R^1$ and $R^2$ may be the same or different); and a second dye precursor which is colored to black color tone, wherein a melting point of the second dye precursor is 200° C. or more.

Item 39: The two-color heat-sensitive recording medium according to any one of items 1, 11 to 16, and 38, wherein the first dye precursor and the second dye precursor are contained in the heat-sensitive recording layer in both a form of solid dispersed fine particles.

Item 40: The two-color heat-sensitive recording medium according to item 38 or 39, the heat-sensitive recording layer having a multilayer structure comprising at least a first heat-sensitive recording layer and a second heat-sensitive recording layer, wherein the first heat-sensitive recording layer contains the first dye precursor, and the second heat-sensitive recording layer contains the second dye precursor.

Item 41: The two-color heat-sensitive recording medium according to any one of items 1, 11 to 16, and 38 to 40, wherein a total content of the dye precursor which contains the second dye precursor and is colored to a black color tone is in a range greater than 0.5 times and less than 2.5 times a content of the first dye precursor.

Item 42: The two-color heat-sensitive recording medium according to any one of items 38 to 41, wherein the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

Item 43: The two-color heat-sensitive recording medium according to any one of items 38 to 42, wherein a dynamic color-development optical density (yellow density of dynamic coloring) achieved by printing on the heat-sensitive recording medium with a thermal head at an applied energy of 0.66 mJ/dot is 1.00 or more, and a dynamic color-development optical density (yellow density of dynamic coloring) achieved by printing on the heat-sensitive recording medium with a thermal head at an applied energy of 0.97 mJ/dot is 1.00 or more.

Item 44: The two-color heat-sensitive recording medium according to any one of items 38 to 43, wherein the support has a metallic luster.

Effect of the Invention

The heat-sensitive recording medium of the present invention has a colored image which is tinged with a metallic luster so as to exhibit a gold metal color tone with a vivid appearance when the support has a metallic luster, which makes it possible to record variable information with an excellent design as an alternative to special color printed products, which have been focused on the printing field until now. In addition, the color optical density is high, and the image stability and light resistance of the colored image are excellent.

In addition, when the heat-sensitive recording medium of the present invention is a two-color heat-sensitive recording medium, the heat-sensitive recording medium exhibits a yellow color tone or, when the support has a metallic luster, a gold metal color tone and a color tone different from the yellow or gold metal color tone. Furthermore each developed color tone develops high density and is excellent with regard to color separation properties.

BEST MODE FOR CARRYING OUT THE INVENTION

In this specification, the expression "contains" includes the concepts of "containing", "comprising essentially", and "comprising only".

The present invention is a heat-sensitive recording medium comprising a heat-sensitive recording layer containing a dye precursor and a developer on a support, the dye precursor being a dye precursor which is colored to a yellow color tone, wherein:

(a) the support has a metallic luster and provides a metallic luster to a surface of a base material not having a metallic luster;

and/or (b) the dye precursor which is colored to a yellow color tone is a first dye precursor, and the heat-sensitive recording medium further contains a second dye precursor which is colored to a different color tone from the first dye precursor.

The support in the present invention is not particularly limited in type, shape, dimensions, or the like, and high-quality paper (acid paper, neutral paper), medium-quality paper, coated paper, art paper, cast-coated paper, glassine paper, pasteboard, cardboard, resin laminate paper, polyolefin synthetic paper, synthetic fiber paper, nonwoven fabrics, synthetic resin films, various transparent supports, or the like, for example, can be appropriately selected and used.

When the support in the present invention has a metallic luster, it need only have a metallic luster on at least one side and is not particularly limited in type, shape, dimensions, or the like. For example, a metal sheet, metal foil, metal film, or the like may itself be a support having a metallic luster, or a support which provides a metallic luster to a base material that does not have a metallic luster as described above may be selected appropriately and used. The base material may be transparent, translucent, or opaque. Of these, when the support has a metallic luster, a support which provides a metallic luster to a film or synthetic paper is preferable in that a specular glossy appearance can be achieved.

Methods for providing a metallic luster to the surface of a base material include plating methods, methods of attaching metal foils such as aluminum foil, and methods of attaching paper or films having a metal vapor deposited film. Further, there are also methods of providing a vapor metal deposition film such as aluminum or silver directly on the base material. In this case, there are direct-vapor deposition methods of providing a smooth resin layer on the surface of the base material in advance and depositing metal vapor thereon so as to form a metal layer, and methods of attaching a metal vapor deposited layer provided in advance on a film and a base material via an adhesive and peeling the film so as to transfer an image. In addition, there are also methods of providing a metallic luster layer by means of printing or coating on a base material. In this case, it is possible to obtain a surface with a metallic luster using a metal powder such as an aluminum powder, for example, or a metal ink obtained by mixing a vehicle with an aluminum paste prepared by dispersing an aluminum powder in a solvent. It is also possible to use an ink which uses an inorganic pearl pigment such as mica or a pigment obtained by coating mica with titanium oxide rather than a metal powder.

The heat-sensitive recording layer in the present invention is formed on a support, and when the support has a metallic luster, the heat-sensitive recording layer covers a part or the entire of metallic luster of the support when viewed from the recording surface side. When the support has a metallic luster, the heat-sensitive recording layer may be formed on the side of the support having a metallic luster, or, in the case of a support having a metallic luster which can be confirmed visually through the base material, as in the case of a transparent base material, for example, the heat-sensitive recording layer may be formed on the opposite side as the surface of the support having a metallic luster. An undercoating layer may be provided between the support and the heat-sensitive recording layer. When the support has a metallic luster, preferably, the undercoating layer does not hide the metallic luster of the support.

When the support has a metallic luster, in the heat-sensitive recording medium of the present invention, the dye precursor in the heat-sensitive recording layer is colored to a yellow color tone, but since the colored image is tinged with a metallic luster when viewed from recording surface side, it can exhibit a gold metal color tone with a vivid appearance. In the present invention, it is thought that the dye precursor present in the heat-sensitive recording layer in the form of fine particles and the developer which reacts to dye precursor under heat once melted by the applied energy of a thermal head or the like and return to solid again, which reduces diffused reflection in the heat-sensitive recording layer and obtain a gold metal tone through the heat-sensitive recording layer. In the present invention, the heat-sensitive recording layer covers the support so as to block the metallic luster of the support, but the degree to which the heat-sensitive recording layer conceals the metallic luster of the support in order for the colored image to exhibit a gold metal tone is not particularly limited, and it may be ordinary paper-like with a matte tone when viewed from the recording surface side, or it may be to a degree in which the metallic luster can be confirmed visually through the heat-sensitive recording layer.

In the present invention, it is preferable for the dynamic color-development optical density achieved by printing on the heat-sensitive recording medium with a thermal head at an applied energy of 0.97 mJ/dot to be 1.00 or more, and for the static color-development starting temperature at which the color optical density achieved by bringing the heat-sensitive recording medium into contact with a hot plate of 40 to 220° C. for 5 seconds at $9.8 \times 10^4$ Pa is 0.2 is 50° C. or more. As a result, the load on the printer is reduced, and a color tone-temperature curve having a contrast is obtained, which makes it possible to increase the color optical density and to achieve a sufficient color tone. By setting the dynamic color-development optical density to 1.00, a level that can be visually evaluated as sufficient is reached, but the dynamic color-development optical density is preferably 1.30 or more and more preferably 1.60 or more. The upper limit of the dynamic color-development optical density is not particularly limited but is preferably at most approximately 2.0 since the color development is saturated when the dynamic color-development optical density exceeds 2.0. Otherwise, the static color-development starting temperature is preferable 60° C. or more. The upper limit of the static color-development starting temperature is not particularly limited but is preferably 90° C. or less, more preferably 80° C. or less, and even more preferably 70° C. or less in order to reduce the load on the printer. Here, the color optical density refers to the Y (yellow) density, and the dynamic color-development optical density refers to the Y (yellow) density of dynamic coloring. Examples of methods for preparing a product having a desired color optical density include adjusting the content of the dye precursor or adjusting the form of the dye precursor.

Here, dynamic coloring refers to coloring achieved by printing with a thermal head, and static coloring refers to coloring achieved by contact with a hot plate.

The content of the dye precursor which is colored to a yellow color tone is preferably 0.7 g/m² or more in terms of dry weight in the heat-sensitive recording layer. The content is preferably 1.0 g/m² or more and even more preferably 1.5 g/m² or more. As a result, it is possible to increase the color optical density and to achieve an even more vivid gold metal tone. The upper limit of the content is not particularly limited but is preferably 6 g/m² or less since the color development is saturated when the content exceeds 6 g/m².

A specific example of the dye which is colored to a yellow color tone is a dye precursor having a pyridine skeleton in the molecular structure represented by the following general formula (1):

Formula 9

General formula (1)

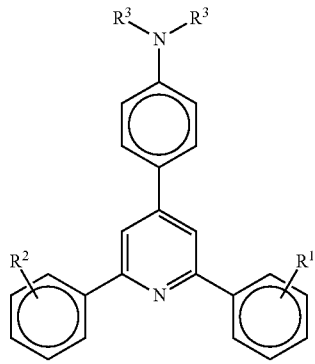

(in the formula, $R^1$ and $R^2$ are hydrogen atoms or alkoxy groups having from 1 to 8 carbon atoms and may be the same or different, and $R^3$ is an alkyl group having from 1 to 4 carbon atoms); and examples of a dye precursor which does not have a pyridine skeleton and is colored to yellow color tone include 3,6-dimethoxyfluoran, 1-(4-n-dodecyloxy-3-methoxyphenyl)-2-(2-quinolyl)ethylene, 2,2-bis(4-(2-(4-diethylaminophenyl)quinazolyl)oxyphenyl)propane, 1-(2-quinolyl)-2-(3-methoxy-4-dodecyloxyphenyl)ethene, and 4-chloro-N-(4-(N-(4-methylbenzyl)-N-methylamino)benzylidene)aniline.

The dye precursor which is colored to a yellow color tone in the present invention preferably has excellent stability of the colored image. When the colored image fades, perhaps due to the fact that the components in the heat-sensitive recording layer are crystallized (although the reason is not certain), there is a risk that the lost of the metallic tone may be more than the fading of the yellow color tone when the support has a metallic luster. In the present invention, a dye precursor having a pyridine skeleton in the molecular structure represented by general formula (1) is preferable as the dye precursor which is colored to a yellow color tone from the perspective of enhancing the stability of the colored image.

From the perspective of further increasing the color optical density, a case in which $R^1$ and $R^2$ are simultaneously hydrogen atoms are preferably excluded in general formula (1), and $R^1$ and $R^2$ are preferably different from one another. In general formula (1), R and $R^2$ are hydrogen atoms or optionally branched alkoxy groups having from 1 to 8 carbon atoms and may be the same or different, and $R^3$ is an optionally branched alkyl group having from 1 to 4 carbon atoms, but at least $R^1$ and $R^2$ are preferably straight-chain saturated hydrocarbon groups in that they can be introduced with industrial ease.

In the present invention, it is preferable for one of $R^1$ and $R^2$ to be an alkoxy group having from 4 to 8 carbon atoms in general formula (1) in that the effect of the present invention can be amply exhibited. Further, it is preferable for one of $R^1$ and $R^2$ to be a hydrogen atom from the perspective of even further increasing the color optical density.

In the present invention, of these dye precursors which are colored to a yellow color tone, the dye precursor is preferably one having a pyridine skeleton in the molecular structure such as 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine. From the perspective of even further enhancing the stability of the colored image, it is preferable to use one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, and 4-[2-(2-hexyloxyphenyl)-6-phenyl-4-pyridinyl]-N,N-dimethylbenzeneamine.

In the present invention, the form of the dye precursor contained in the heat-sensitive recording layer is not particularly limited, and the dye precursor may be contained in the heat-sensitive recording layer in the form of solid dispersed fine particles or in a form in which fine composite particles containing a dye precursor and a polymer compound such as a hydrophobic resin are formed.

When the present invention is a two-color heat-sensitive recording medium, it is a heat-sensitive recording medium comprising a heat-sensitive recording layer containing a dye precursor and a developer on a support, the dye precursor containing a first dye precursor having a pyridine skeleton in a molecular structure represented by general formula (1) and a second dye precursor which is colored to a different color from the first dye precursor.

In addition, the present invention is a heat-sensitive recording medium comprising a heat-sensitive recording layer containing a dye precursor and a developer on a support, the dye precursor containing a first dye precursor having a pyridine skeleton in a molecular structure represented by general formula (1) and a second dye precursor which is colored to a different color from the first dye precursor, wherein the first color is a color tone caused by the coloring of the first dye precursor, and the second color is a mixed color tone caused by the coloring of the first dye precursor and the second dye precursor.

When the present invention is a two-color heat-sensitive recording medium, the second dye precursor is a dye precursor having the form of fine composite particles containing the second dye precursor and a polymer compound (b1) or having a melting point of 200° C. or more (b2).

Due to the form of the fine composite particles described above, the coloring of the first dye precursor exhibits excellent color separation properties with respect to mixed colors caused by the coloring of the first dye precursor and the second dye precursor and can exhibit a vivid yellow color tone. In addition, the first dye precursor can also be used in the form of fine composite particles having a different coloring starting temperature or recording sensitivity from the fine composite particles of the second dye precursor. On the other hand, when the first dye precursor is contained in the heat-sensitive recording layer in the form of fine composite particles and the second dye precursor is contained in the heat-sensitive recording layer in the form of solid dispersed fine particles, for example, the yellow color tone caused by the coloring of the second dye precursor and the coloring of the first dye precursor is a mixed color, so a vivid yellow color tone is not achieved, and the two colors are both similar to the color tone of the second dye precursor, which is not preferable in that the color separation properties is poor.

In addition, second dye precursor (b2) having a melting point of 200° C. or more preferably contains a second dye precursor which is colored to a black color tone, and it is possible to obtain a heat-sensitive recording medium having excellent color separation properties with respect to the second dye precursor and exhibiting two colors including a first yellow color and a second black color with excellent visibility by limiting the first dye precursor of a color tone different from a black color tone to a yellow color tone and selecting a specific first dye precursor having a high color optical density and exhibiting a vivid yellow color tone.

When the present invention is a two-color heat-sensitive recording medium and the support does not have a metallic luster, the first color is a yellow color tone. Of dye precursors which are colored to a yellow color tone, the first dye precursor having a pyridine skeleton in the present invention is colored to a vivid yellow color tone, which yields an excellent color-expanding effect of making a yellow colored image caused by the first dye precursor stand out and appear closer and larger than the actual dimensions. In the present invention, by combining the first color and the second color obtained when the first dye precursor and the second dye precursor are colored and mixed, it is possible to display variable information such as text or graphics, for example, by selecting a negative/positive image as a yellow warning color.

Further, in the heat-sensitive recording medium of the present invention, when the support has a metallic luster and the medium is a two-color heat-sensitive recording medium, the first color is a metallic color tone tinged with the metallic luster of the support due to the coloring of the first dye precursor. Of dye precursors which are colored to a yellow color tone, a gold metal tone can be obtained as the first color tone when the first dye precursor having a pyridine skeleton in the present invention is colored to a vivid yellow color tone and is tinged with the metallic luster of the support. In the present invention, by combining the first color and the second color obtained when the first dye precursor and the second dye precursor are colored and mixed, it is possible to display variable information such as text or graphics, for example, by selecting a negative/positive image for the gold metal tone.

In addition, when the present invention is a two-color heat-sensitive recording medium, it can emit fluorescent light under ultraviolet rays when the first dye precursor having a pyridine skeleton is colored. As a result, it is possible to display a yellow colored image caused by the first dye precursor as a reflected image in a dark location out of at least two colors.

When the present invention is a two-color heat-sensitive recording medium, it is preferable for the dynamic color-development optical density (yellow density of dynamic coloring) achieved by printing on the heat-sensitive recording medium with a thermal head at an applied energy of 0.66 mJ/dot to be 1.00 or more, and for the dynamic color-development optical density (yellow density of dynamic coloring) achieved by printing on the heat-sensitive recording medium with a thermal head at an applied energy of 0.97 mJ/dot to be 1.00 or more. As a result, it is possible to achieve even better color separation properties and a sufficient yellow color tone or, when the support has a metallic luster, a gold metal color tone. A difference in applied energy is preferable in order to enhance the color separation properties, and by setting the applied energy to within this range, there is no risk of background fogging, and it is possible to reduce the load on the printer. By setting the dynamic color-development optical density (yellow density of dynamic coloring) to 1.00, a level that can be visually evaluated as sufficient is reached, but the dynamic color-development optical density (yellow density of dynamic coloring) achieved by printing with a thermal head at an applied energy of 0.66 mJ/dot is more preferably 1.10 or more and even more preferably 1.15 or more. In addition, the dynamic color-development optical density (yellow density of dynamic coloring) achieved by printing with a thermal head at an applied energy of 0.97 mJ/dot is more preferably 1.40 or more and even more preferably 1.80 or more. Here, the color-development optical density refers to the Y (yellow) density. Examples of methods for preparing a product having a desired color optical density of the development include adjusting the content of the dye precursor or adjusting the form of the dye precursor.

The second dye precursor when the present invention is a two-color heat-sensitive recording medium is colored to a different color tone from the first dye precursor. Specific examples of the second dye precursor include dye precursors which are colored to a black, blue, cyan, green, red, or magenta color tone and dye precursors exhibiting absorption in the near-infrared region when colored. The second dye precursor is not limited to a single compound, and a desired color tone may also be achieved by mixing two or three or more types of dye precursors having different color tones.

Examples of dye precursors which are colored to a black color tone include 3-pyrrolidino-6-methyl-7-anilinofluoran, 3-diethylamino-7-(m-trifluoromethylanilino)fluoran, 3-diethylamino-6-methyl-7-(m-methylanilino)fluoran, 3-(N-isoamyl-N-ethylamino)-7-(o-chloroanilino)fluoran, 3-(N-ethyl-p-toluidino)-6-methyl-7-anilinofluoran, 3-(N-ethyl-N-2-tetrahydrofurfurylamino)-6-methyl-7-anilinofluoran, 3-diethylamino-6-chloro-7-anilinofluoran, 3-di(n-butyl)amino-6-methyl-7-anilinofluoran, 3-di(n-amyl)amino-6-methyl-7-anilinofluoran, 3-(N-isoamyl-N-ethylamino)-6-methyl-7-anilinofluoran, 3-(N-n-hexyl-N-ethylamino)-6-methyl-7-anilinofluoran, 3-(N-(3-ethoxypropyl)-N-ethylamino)-6-methyl-7-anilinofluoran, 3-(N-(3-ethoxypropyl)-N-methylamino)-6-methyl-7-anilinofluoran, 3-diethylamino-7-(2-chloroanilino)fluoran, 3-di(n-butyl)amino-7-(2-chloroanilino)fluoran, 3-diethylamino-6-methyl-7-anilinofluoran, 3-diethylamino-6-methyl-7-(2,6-dimethylanilino)fluoran, 3-dethylamino-6-methyl-7-(2,4-dimethylanilino)fluoran, 2,4-dimethyl-6-(4-dimethylaminoanilino)fluoran, and 3-(N-cyclohexyl-N-methylamino)-6-methyl-7-anilinofluoran.

Of dye precursors which are colored to a black color tone, it is preferable to use at least one type selected from 3-di(n-butyl)amino-6-methyl-7-anilinofluoran, 3-di(n-amyl)amino-6-methyl-7-anilinofluoran, 3-diethylamino-6-methyl-7-(2,6-dimethylanilino)fluoran, 3-diethylamino-6-methyl-7-(2,4-dimethylanilino)fluoran, and 2,4-dimethyl-6-(4-dimethylaminoanilino)fluoran, which have relatively superior light resistance.

Examples of dye precursors which are colored to a blue color tone include 3,3-bis(p-dimethylaminophenyl)-6-dimethylaminophthalide, 3-(4-diethylamino-2-methylphenyl)-3-(4-dimethylaminophenyl)-6-dimethylaminophthalide, 3-(4-diethylamino-2-ethoxyphenyl)-3-(1-ethyl-2-methylindole-3-yl)4-azaphthalide, 3-(1-ethyl-2-methylindole-3-yl)-3-(4-diethylaminophenyl)phthalide, 3-(1-ethyl-2-methylindole-3-yl)-3-(2-methyl-4-diethylaminophenyl)-4-azaphthalide, 3-(1-ethyl-2-methylindole-3-yl)-3-(2-ethoxy-4-diethylaminophenyl)-4-azaphthalide, 3-(1-ethyl-2-methylindole-3-yl)-3-(2-n-hexyloxy-4-diethylaminophenyl)-4-azaphthalide, and 3-diphenylamino-6-diphenylaminofluoran.

Examples of dye precursors which are colored to a cyan color tone include 3-(1-ethyl-2-methylindole-3-yl)-3-(4-diethylamino-2-methylphenyl)-4-azaphthalide, 3-[1,1-bis(p-diethylaminophenyeethylene-2-yl]-6-dimethylaminophthalide, and 3,3-bis(4-diethylamino-2-ethoxyphenyl)-4-azaphthalide.

Examples of dye precursors which are colored to a green color tone include 3-(N-ethyl-N-n-hexylamino)-7-anilinofluoran, 3-diethylamino-7-dibenzylaminofluoran, 3,3-bis(4-diethylamino-2-ethoxyphenyl)-4-azaphthalide, 3-(N-ethyl-N-p-tolylamino)-7-(N-phenyl-N-methylamino)fluoran, 3-[p-(p-anilinoanilino)anilino]-6-methyl-7-chlorofluoran, and 3,6-bis(dimethylamino)fluorene-9-spiro-3'-(6'-dimethylamino)phthalide.

In addition, examples of dye precursors exhibiting absorption in the near-infrared region include 3,3-bis[1,1-bis(4-pyrrolidinophenyl)ethylene-2-yl]-4,5,6,7-tetrabromophthalide, 3,3-bis[1-(4-methoxyphenyl)-1-(4-dimethylaminophenyl)ethylene-2-yl]-4,5,6,7-tetrachlorophthalide, 3,3-bis[1-(4-methoxyphenyl)-1-(4-pyrrolidinophenyl)ethylene-2-yl]-4,5,6,7-tetrachlorophthalide, 3-[p-(p-anilinoanilino)anilino]-6-methyl-7-chlorofluoran, 3-[p-(p-dimethylaminoanilino)anilino]-6-methyl-7-chlorofluoran, 3,6-bis(dimethylamino)fluorene-9-spiro-3'-(6'-dimethylamino)phthalide, bis(p-dimethylaminostyryl)-p-tolylsulfonylmethane, 3-[p-(p-dimethylaminoanilino)anilino]-6-methylfluoran, 3-di(n-pentyl)amino-6,8,8-trimethyl-8,9-dihydro-(3,2,e)pyridofluoran, 3-di(n-butyl)amino-6,8,8-trimethyl-8,9-dihydro-(3,2,e)pyridofluoran, 3-(p-n-butylaminoanilino)-6-methyl-7-chlorofluoran, and 2-methydino-8-diethylamino-benz[C]fluoran.

Examples of dye precursors which are colored to a red color tone include 3,6-bis(diethylamino)fluoran-γ-anilinolactam, 3,6-bis(diethylamino)fluoran-γ-(p-nitro)anilinolactam, 3,6-bis(diethylamino)fluoran-γ-(o-chloro)anilinolactam, 3-dimethylamino-7-bromofluoran, 3-diethylaminofluoran, 3-diethylamino-6-methylfluoran, 3-diethylamino-7-methylfluoran, 3-diethylamino-7-chlorofluoran, 3-diethylamino-7-bromofluoran, 3-diethylamino-7,8-benzofluoran, 3-diethylamino-6,8-dimethylfluoran, 3-diethylamino-6-methyl-7-chlorofluoran, 3-diethylamino-7-tert-butylfluoran, 3-(N-ethyl-N-tolylamino)-7-methylfluoran, 3-(N-ethyl-N-tolylamino)-7-ethylfluoran, and 3-(N-ethyl-N-isobutylamino)-6-methyl-7-chlorofluoran.

Further, examples of dye precursors which are colored to a red color tone include 3-cyclohexylamino-6-chlorofluoran, 3-di(n-butyl)amino-6-methyl-7-bromofluoran, 3-di(n-butyl)amino-7,8-benzofluoran, 3-tolylamino-7-methylfluoran, 3-tolylamino-7-ethylfluoran, 2-(N-acetylanilino)-3-methyl-6-di(n-butyl)aminofluoran, 2-(N-propionylanilino)-3-methyl-6-di(n-butyl)aminofluoran, 2-(N-benzoylanilino)-3-methyl-6-di(n-butyl)aminofluoran, 2-(N-carbobutoxyanilino)-3-methyl-6-di(n-butyl)aminofluoran, 2-(N-formylanilino)-3-methyl-6-di(n-butyl)aminofluoran, 2-(N-benzylanilino)-3-methyl-6-di(n-butyl)aminofluoran, 2-(N-allylanilino)3-methyl-6-di(n-butyl)aminofluoran, 2-(N-methylanilino)-3-methyl-6-di(n-butyeaminofluoran, and 3-diethylamino-7-phenoxyfluoran.

Further, 3,3-bis(1-ethyl-2-methylindole-3-yl)phthalide, 3,3-bis(1-n-octyl-2-methylindole-3-yl)phthalide, 7-(N-ethyl-N-isoamylamino)-3-methyl-1-phenylspiro[(1,4-dihydrochromeno[2,3-c]pyrazole)-4,3'-phthalide], 7-(N-ethyl-N-isoamylamino)-3-methyl-1-p-methylphenylspiro[(1,4-dihydrochromeno[2,3-c]pyrazole)-4,3'-phthalide], and 7-(N-ethyl-N-n-hexylamino)-3-methyl-1-phenylspiro[(1,4-dihydrochromeno[2,3-c]pyrazole-4,3'-phthalide] are examples of dye precursors which are colored to a magenta color tone.

Examples of dye precursors which are colored to a magenta color tone include 3-(N-ethyl-N-isoamylamino)-7,8-benzofluoran, 3,3-bis(1-n-butyl-2-methylindole-3-yl) phthalide, and 3-(N-ethyl-N-isoamylamino)-7-phenoxyfluoran.

When the present invention is a two-color heat-sensitive recording medium and has a dye precursor in which the melting point of the second dye precursor is at least 200° C. and which is colored to a black color tone, the dye precursor is not particularly limited, but specific examples include 3-pyrrolidino-6-methyl-7-anilinofluoran (melting point: 226° C.), 3-(N-ethyl-p-toluidino)-6-methyl-7-anilinofluoran (melting point: 207° C.), 3-diethylamino-7-(2-chloroanilino)fluoran (melting point: 220° C.), 3-(N-ethyl-p-toluidino)-6-methyl-7-(p-toluidino)fluoran (melting point: 228° C.), 3-diethylamino-7-(o-fluoroanilino)fluoran (melting point: 215° C.), 3-(N-cyclohexyl-N-methylamino)6-methyl-7-anilinofluoran (melting point: 202° C.), 3-piperidino-6-methyl-7-anilinofluoran (melting point: 226° C.), and 3-(4-dimethylamino)anilino-5,7-dimethylfluoran (melting point: 235° C.). Of these, 3-(N-ethyl-p-toluidino)-6-methyl-7-anilinofluoran is particularly preferable due to its excellent light resistance.

When at least the second dye precursor of the present invention is contained in the heat-sensitive recording layer in the form of fine composite particles, due to the form of the fine composite particles, the coloring of the first dye precursor yields excellent color separation properties with respect to mixed colors caused by the coloring of the first dye precursor and the second dye precursor, is colored to a vivid yellow color tone, and can exhibit colored image with a gold metal tone tinged with the metallic luster of the support. In addition, the first dye precursor can also be used in the form of fine composite particles having a different coloring starting temperature or recording sensitivity from the fine composite particles of the second dye precursor. On the other hand, when the first dye precursor is contained in the heat-sensitive recording layer in the form of fine composite particles and the second dye precursor is contained in the heat-sensitive recording layer in the form of solid dispersed fine particles, for example, the yellow color tone caused by the coloring of the second dye precursor and the coloring of the first dye precursor is a mixed color, so a vivid yellow color tone is not achieved, and a gold metal tone cannot be exhibited. The two colors are both similar to the color tone of the second dye precursor, which is not preferable in that the color separation properties is poor.

When the dye precursor is used in the form of solid dispersed fine particles, a water, for example, may be used as a dispersion medium, and the substance may be pulverized with various wet pulverizers such as a sand mill, an attritor, a ball mill, or a Cobot mill so as to form a dispersion. In addition to water-soluble polymer compounds including polyacrylamide, polyvinylpyrrolidone, polyvinyl alcohols, modified polyvinyl alcohols such as sulfone-modified polyvinyl alcohol, methylcellulose, carboxymethylcellulose, and styrene-maleic anhydride copolymer salts and derivatives thereof, the substance may be dispersed in the dispersion medium in the presence of surfactants, defoaming agents, and the like as necessary to form a dispersion. This dispersion is used to prepare a coating liquid for forming a heat-sensitive recording layer. In addition, after the dye precursor is dissolved in an organic solvent, the solution may be emulsified and dispersed in water using the water-soluble polymer compound described above as a stabilizer, and the dye precursor may be formed into solid dispersed fine particles and used by evaporating the organic solvent from the emulsion. In any case, the volume average particle size of the solid dispersed fine particles of the dye precursor used in the form of solid dispersed fine particles is preferably from approximately 0.2 to approximately 3.0 μm and more preferably from approximately 0.3 to approximately 1.0 μm in order to achieve an appropriate recording sensitivity.

In the present invention, a preferable mode is one in which the first dye precursor is contained in the heat-sensitive recording layer in the form of solid dispersed fine particles and the second dye precursor is contained in the heat-sensitive recording layer in the form of fine composite particles in that it is possible to reduce the load on the printer and to exhibit sufficient color separation properties.

The fine composite particles in the present invention contain a dye precursor and a polymer compound. It is preferable for at least the second dye precursor to be contained in the heat-sensitive recording layer in a form in which fine composite particles containing the second dye precursor and a hydrophobic resin as a polymer compound are formed.

Examples of forms in which fine composite particles containing a dye precursor and a hydrophobic resin are formed include:

(1) a form in which one or more types of dye precursors are microencapsulated using a hydrophobic resin serving as a wall film;

(2) a form in which one or more types of dye precursors are contained in a base material comprising a hydrophobic resin obtained by polyvalent isocyanate or the like; and (3) a form in which a compound having unsaturated carbon bonds is polymerized with the fine particle surface of one or more types of dye precursors.

An example of a production method for particles of the form of (1) is the method described in Japanese Unexamined Patent Application Publication No. S60-244594. An example of a production method for particles of the form of (2) is the method described in Japanese Unexamined Patent Application Publication No. H9-263057. An example of a production method for particles of the form of (3) is the method described in Japanese Unexamined Patent Application Publication No. 2000-158822.

The hydrophobic resin used to form the fine composite particles is not particularly limited, but examples include urea resins, urethane resins, urea-urethane resins, styrene resins, and acrylic resins. Of these, urea resins and urea-urethane resins have excellent heat-resistant background fogging, so a form in which the second dye precursor forms fine composite particles with a polyurea or polyurea-polyurethane resin is preferable.

The polyvalent isocyanate compound used in the production of the fine composite particles is a compound which reacts with water to form polyurea or polyurea-polyurethane, and it may be a polyvalent isocyanate compound alone, a mixture of a polyvalent isocyanate compound and a polyol or polyamine which reacts with the compound, a polyvalent isocyanate compound and a polyol adduct, a biuret product of a polyvalent isocyanate compound, or a multimer such as an isocyanurate form. The dye precursor is dissolved in these polyvalent isocyanate compounds, and this solution is emulsified and dispersed in an aqueous medium containing a dissolved protective colloid substance such as polyvinyl alcohol so that the volume average particle size is preferably from approximately 0.2 to approximately 3.0 µm and more preferably from approximately 0.2 to approximately 1.5 µm. After a reactive substance such as polyamine is further mixed as necessary, the emulsified dispersion is heated so as to polymerize the polyvalent isocyanate compound. As a result, it is possible to polymerize the polyvalent isocyanate compound and to form fine composite particles containing the dye precursor.

The dye precursor contained in the fine composite particles has a high degree of isolation from the outside, and the coloring body thereof has much better image stability than a coloring body colored in the solid dispersed fine particle state and has excellent resistance to oil or plasticizers, in particular. The reason for this is not necessarily clear, but it may be due to the fact that the coloring body and the polymer substance (base material) have some kind of interaction and are therefore stabilized.

The external appearance of the fine composite particles used in the present invention may be roughly spherical or in the form of somewhat dented blood red cell when observed under an electron microscope. In a cross-sectional observation under an electron microscope, the shape is solid, porous, or hollow. In addition, the volume average particle size is preferably from approximately 0.2 to approximately 1.5 µm in order to achieve the proper recording sensitivity. Setting the volume average particle size to at least 0.2 µm is desirable from the perspective of enhancing the stability of the colored image with respect to oil, plasticizers, or the like.

In addition to the dye precursor, the fine composite particles used in the present invention may also contain ultraviolet absorbers, antioxidants, and mold-releasing agents as well as sensitizers or the like that are known to be used in heat-sensitive recording mediums.

Examples of methods of encapsulating the dye precursor in microcapsules include a method of microencapsulating the dye precursor with a coacervation method or an in-situ method after the dye precursor has been wet-pulverized to a volume average particle size of approximately 0.2 to approximately 0.3 µm, and a method of microencapsulating the dye precursor by interfacial polymerization after the dye precursor has been emulsified and dispersed together with the polyvalent isocyanate compound and an organic solvent as necessary.

An example of a wall film agent of the microcapsules is gelatin in the case of a coacervation method and a melamine-formaldehyde resin in the case of an in-situ method. In addition, in the case of interfacial polymerization, a polyurea polyurethane resin, for example, may be used. The amount of the film wall material is from approximately 1 to approximately 30 wt. % with respect to the total solid weight of the microcapsules. The volume average particle size of the microcapsules is from approximately 0.5 to approximately 5 µm.

The forms of (1) and (2) of these fine composite particles yield superior transparency of the heat-sensitive recording layer in comparison to cases in which the dye precursor is used in the form of solid dispersed fine particles, and a heat-sensitive recording layer with high transparency may also be provided.

The heat-sensitive recording layer in the present invention is formed so that the first dye precursor and the second dye precursor are contained in the same recording layer. In addition, the first dye precursor and the second dye precursor may be respectively contained in separate recording layers, and these may be laminated to form the heat-sensitive recording layer. That is, in the present invention, one or two or more heat-sensitive recording layers may be provided. A specific example is an aspect in which the heat-sensitive recording layer has a multilayer structure comprising at least a first heat-sensitive recording layer and a second heat-sensitive recording layer, wherein the first heat-sensitive recording layer contains a first dye precursor and a developer, and the second heat-sensitive recording layer contains a second dye precursor and a developer. As a result, it is possible to adjust the color optical density of the first color and the second color. The lamination order of the heat-sensitive recording layers may be such that the side closest to the support is the first heat-sensitive recording layer or the second heat-sensitive recording layer. In the present invention, the second color is formed by mixed colors, so the stability of the colored image can be increased without containing a decolorizing agent for the first color.

Since the second dye precursor is contained in the form of fine composite particles in the two-color heat-sensitive recording medium of the present invention, the two-color heat-sensitive recording medium first exhibits a first color due to the coloring of the first dye precursor as a result of an increase in temperature, and it then exhibits a second color when the second dye precursor is colored and mixed. In addition, as a method of two-color heat-sensitive recording in the present invention, recording may be performed while varying the applied energy by controlling the width of one pulse and the number of repetitions while maintaining a constant applied voltage using a thermal head, for example. As a specific example, by applying an applied energy which is sufficient to reach the coloring starting temperature of the first dye precursor and is insufficient to reach the coloring starting temperature of the fine composite particles containing the second dye precursor, the coloring of the first dye precursor is achieved, and when the support has a metallic luster, a first color tinged with the metallic luster is achieved. On the other hand, by applying an applied energy sufficient to reach the coloring starting temperature of both of the first dye precursor and of the fine composite particles containing the second dye precursor, a second color is achieved as a result of the coloring and mixing of both the first dye precursor and the second dye precursor.

The second color in the present invention is preferably a red, black, or green color tone. As specific examples, a red color tone is achieved when the second dye precursor is a dye precursor which is colored to a magenta color tone; a black color tone is achieved when the second dye precursor is a dye precursor which is colored to a black color tone; and a green color tone is achieved when the second dye precursor is a dye precursor which is colored to a cyan color tone.

The coloring starting temperature is dependent on the polymer properties of the fine composite particles and the type of the developer, so it is not restricted by the type of a dye precursor having a specific melting point, and a plurality of dye precursors may be selected and used in combination in order to achieve a preferable color tone. The polymer properties of the fine composite particles can be controlled by composition and production conditions of the fine composite particles such as the polyvalent isocyanate compound, a reaction accelerator, and the like that are used.

The forms of (1) and (2) of these fine composite particles yield superior transparency of the heat-sensitive recording layer in comparison to cases in which the dye precursor is used in the form of solid dispersed fine particles. In the present invention, by providing a heat-sensitive recording layer having high transparency, it is possible to obtain a heat-sensitive recording medium in which the background part exhibits a silver metal tone through the heat-sensitive recording layer and the colored image exhibits a gold metal tone.

In addition, in the present invention, by utilizing the dynamic coloring properties and the static coloring properties and providing a heat-sensitive recording layer using an aluminum-deposited support so as to conceal the metallic luster of the support, for example, it is possible to record both a colored image with a gold metal tone and an image with a silver metal tone. As a preferred recording method in this case, a colored image with a gold metal tone can be recorded by heating with the thermal head of a printer, for example, at an applied energy at which the temperature reaches or exceeds the static color-development starting temperature, and an image can be recorded with a silver metal tone at an applied energy at which the dynamic color-development optical density (yellow density of dynamic coloring) is less than 1.00. By setting the temperature to the static color-development starting temperature or higher, an applied energy sufficient to exhibit a gold color is applied, and by setting the dynamic color-development optical density (yellow density of dynamic coloring) to less than 1.00, although it is insufficient to exhibit a gold color, it is possible to melt part of the dye precursor or the developer so as to express the metallic luster of the support and to exhibit a silver color.

The content ratio of the dye precursor is preferably from approximately 5 to approximately 30 mass %, more preferably from approximately 7 to approximately 30 mass %, and even more preferably from approximately 7 to approximately 25 mass % of the total solid content of each heat-sensitive recording layer. By setting the content ratio to at least 5 mass %, it is possible to enhance the color optical density. By setting the content ratio to at most 30 mass %, it is possible to enhance the heat resistance.

In the present invention, the total dye precursor content which contains the second dye precursor in the heat-sensitive recording layer and is colored to a black color tone is preferably set to a range of greater than 0.5 times and less than 2.5 times the coated amount of the first dye precursor. The total content is more preferably in a range of at least 1.0 times and at most 2.0 times the coated amount of the first dye precursor. As a result, it is possible to further enhance the yellow color tone serving as the first color and the color separation properties of the black color serving as the mixed color in the second color.

The developer contained in the heat-sensitive recording layer of the present invention is selected from agents having the property of being liquefied or dissolved as a result of an increase in temperature and having a property of coloring the dye precursor when making contact with the dye precursor, and representative examples thereof include organic acidic substances such as phenol compounds, aromatic carboxylic acid, or polyvalent metal salts of these compounds.

The developer ordinarily may be present in the fine composite particles or microcapsules and may also be present in the state of solid dispersed fine particles. The developer content is preferably from approximately 30 to approximately 1,500 parts by mass, more preferably from approximately 50 to approximately 1,000 parts by mass, even more preferably from approximately 100 to approximately 600 parts by mass, particularly preferably from approximately 140 to approximately 600 parts by mass, and most preferably from approximately 200 to approximately 500 parts by mass per total of 100 parts by mass of the dye precursor in each heat-sensitive recording layer. The fine composite particles can be prepared with the same method as the method for preparing the fine composite particles containing the dye precursor.

Examples of representative developers include compounds such as 4-tert-butylphenol, 4-acetylphenol, 4-tert-octylphenol, 4,4'-sec-butylidenediphenol, 4-phenylphenol, 4,4'-dihydroxydiphenylmethane, 4,4'-isopropylidenediphenol, 4,4'-dihydroxydiphenyl ether, 4,4'-cyclohexylidenediphenol, 1,1-bis(4-hydroxyphenyl)ethane, 1,1-bis(4-hydroxyphenyl)-1-phenylethane, 4,4'-dihydroxydiphenylsulfide, 4,4'-thiobis(3-methyl-6-tert-butylphenol), 4,4'-dihydroxydiphenylsulfone, 2,4'-dihydroxydiphenylsulfone, 4-hydroxy-4'-isopropoxydiphenylsulfone, 4-hydroxy-4'-n-propoxydiphenylsulfone, 4-hydroxy-4'-allyloxydiphenylsulfone, bis(3-allyl-4-hydroxyphenyl)sulfone, 4,4'-bis[(4-methyl-3-phenoxycarbonylaminophenyl)ureido]diphenylsulfone, 4-[4'-(1'-methylethyloxy)phenyl]sulfonylphenol, N-(p-toluenesulfonyl)-N'-(3-p-toluenesulfonyloxyphenyl)urea, N-p-tolylsulfonyl-p-butoxycarbonylphenylurea, N-(p-toluenesulfonyl)-N'-phenylurea, and 4,4'-bis(3-tosylureido)diphenylmethane.

Further, examples of compounds that can be used as developers in the present invention include phenol compounds or benzoic acids such as 4-hydroxybenzophenone, dimethyl 4-hydroxyphthalate, methyl 4-hydroxybenzoate, propyl 4-hydroxybenzoate, sec-butyl 4-hydroxybenzoate, phenyl 4-hydroxybenzoate, benzyl 4-hydroxybenzoate, tolyl 4-hydroxybenzoate, chlorophenyl 4-hydroxybenzoate, and 4,4'-dihydroxydiphenyl ether; aromatic carboxylic acids such as p-tert-butylbenzoic acid, trichlorobenzoic acid, terephthalic acid, salicylic acid, 3-tert-butylsalicylic acid, 3-isopropylsalicylic acid, 3-benzylsalicylic acid, 3,5-(α-methylbenzyl)salicylic acid, and 3,5-di-tert-butylsalicylic acid; and organic acidic substances such as salts of the phenol compounds or aromatic carboxylic acids with polyvalent metals such as zinc, magnesium, aluminum, and calcium, for example.

Of these developers, at least one type selected from the group consisting of 4-hydroxy-4'-isopropoxydiphenylsulfone, 4-hydroxy-4'-n-propoxydiphenylsulfone, 4-hydroxy-4'-allyloxydiphenylsulfone, bis(3-allyl-4-hydroxyphenyl)sulfone, 4,4'-bis[(4-methyl-3-phenoxycarbonylaminophenyl)ureido]diphenylsulfone, N-p-tolylsulfonyl-N'-p-butoxycarbonylphenylurea, N-(p-toluenesulfonyl)-N'-(3-p-toluenesulfonyloxyphenyl)urea, N-(p-toluenesulfonyl)-N'-phenylurea, and 4,4'-bis(3-tosylureido)diphenylmethane is preferable. As a result, an even more vivid yellow color tone is achieved, which makes it possible to thoroughly exhibit the effect of the present invention. Further, at least one type selected from 4-hydroxy-4'-isopropoxydiphenylsulfone, bis(3-allyl-4-hydroxyphenyl)sulfone, N-(p-toluenesulfonyl)-N'-(3-p-toluenesulfonyloxyphenyl)urea, 4,4'-bis(3-tosylureido)diphenylmethane, N-(p-toluenesulfonyl)-N'-phenylurea, and N-p-tolylsulfonyl-N'-p-butoxycarbonylphenylurea is preferable.

In the present invention, an image stability enhancer may be further contained in the heat-sensitive recording layer primarily in order to even further increase the stability of the colored image. As such an image stability enhancer, it is possible to use at least one type selected from phenol compounds such as 1,1,3-tris(2-methyl-4-hydroxy-5-cyclohexylphenyl)butane, 1,1,3-tris(2-methyl-4-hydroxy-5-tert-butylphenyl)butane, 1,1-bis(2-methyl-4-hydroxy-5-tert-butylphenyebutane, 4,4'-[1,4-phenylenebis(1-methylethylidene)]bisphenol, and 4,4'[1,3-phenylenebis(1-methylethylidene)]bisphenol; epoxy compounds such as 4-benzyloxyphenyl-4'-(2-methyl-2,3-epoxypropyloxy)phenylsulfone, 4-(2-methyl-1,2-epoxyethyl)diphenylsulfone, and 4-(2-ethyl-1,2-epoxyethyl)diphenylsulfone; and isocyanuric acid compounds such as 1,3,5-tris(2,6-dimethylbenzyl-3-hydroxy-4-tert-butyl)isocyanuric acid. Of course, the image stability enhancers are not limited to these examples, and two or more compounds may also be used in combination as necessary.

In the present invention, a sensitizer may be further contained in the heat-sensitive recording layer in order to enhance the recording sensitivity. Compounds conventionally known as sensitizers for heat-sensitive recording mediums can be used as sensitizers, examples of which include parabenzylbiphenyl, dibenzylterephthalate, phenyl 1-hydroxy-2-naphthoate, dibenzyl oxalate ester, di-o-chlorobenzyle adipate, 1,2-diphenoxyethane, 1,2-di(3-methylphenoxy)ethane, di-p-methylbenzyl oxalate ester, di-p-chlorobenzyl oxalate ester, 2-naphthylbenzyl ether, diphenylsulfone, 1,2-diphenoxymethylbenzene, 1,2-bis(3,4-dimethylphenyl)ethane, 1,3-bis(2-naphthoxy)propane, meta-terphenyl, diphenyl, and benzophenone.

The developer and auxiliary agents such as an image stability enhancer and a sensitizer used in the heat-sensitive recording layer may be dispersed in water with the same method as that when the dye precursor is used in the form of solid dispersed fine particles, and these substances may be mixed therein at the time of the preparation of a coating liquid for the heat-sensitive recording layer. In addition, these auxiliary agents may be dissolved in a solvent, emulsified in water using a water-soluble polymer compound as an emulsifier, and used. Further, the image stability enhancer and the sensitizer may be contained in the fine composite particles containing the dye precursor.

A fine particulate pigment having a high whiteness and an average particle size of at most 10 μm may be contained in the heat-sensitive recording layer for the purpose of enhancing the whiteness of the heat-sensitive recording layer and enhancing the uniformity of the image. For example, inorganic pigments such as calcium carbonate, magnesium carbonate, kaolin, clay, talc, calcined clay, silica, diatomaceous earth, synthetic aluminum silicate, zinc oxide, titanium oxide, aluminum hydroxide, barium sulfate, and surface-treated calcium carbonate or silica; and organic pigments such as urea-formalin resins, styrene-methacrylic acid copolymer resins, and polystyrene resins can be used.

As other component materials constituting the heat-sensitive recording layer, it is possible to use binders and, if necessary, crosslinking agents, waxes, metal soaps, colored dyes, colored pigments, and fluorescent dyes. Examples of binders include polyvinyl alcohols and derivatives thereof; starches and derivatives thereof; cellulose derivatives such as hydroxymethylcellulose, hydroxyethylcellulose, hydroxypropylcellulose, methylcellulose, and ethylcellulose; water-soluble polymer materials such as polyacrylic acid soda, polyvinylpyrrolidone, acrylamide-acrylic acid ester copolymers, acrylamide-acrylic acid ester-methacrylic acid ester copolymers, styrene-maleic anhydride copolymers, isobutylene-maleic anhydride copolymers, casein, gelatin, and derivatives thereof; latexes of water-insoluble polymers such as polyvinylacetate, polyurethane, polyacrylic acid, polyacrylic acid ester, vinyl chloride-vinyl acetate copolymers, polybutylmethacrylate, emulsions such as ethylene-vinyl acetate copolymers, styrene-butadiene copolymers, and styrene-butadiene-acryl copolymers.

Examples of crosslinking agents include aldehyde compounds such as glyoxal, polyamine compounds such as polyethyleneimine;

epoxy compounds, polyamide resins, melamine resins, glyoxylic acid salts, dimethylol urea compounds, aziridine compounds, block isocyanate compounds, and inorganic compounds such as ammonium persulfate, ferric chloride, magnesium chloride, soda tetraborate, and potassium tetraborate; or boric acid, boric acid triesters, borone polymers, hydrazide compounds, and glyoxylic acid salts. One type of these compounds may be used alone, or two or more types may be used in combination. The amount of the crosslinking agent that is used is preferably in a range of approximately 1 to approximately 10 parts by mass per 100 parts by mass of the total solid content of the heat-sensitive recording layer. As a result, it is possible to enhance the water resistance of the heat-sensitive recording layer.

Examples of waxes include waxes such as paraffin wax, carnauba wax, microcrystalline wax, polyolefin wax, and polyethylene wax; higher fatty acid amides such as stearic acid amide and ethylene bis stearic acid, for example, higher fatty acid esters, and derivatives thereof.

Examples of metal soaps include higher fatty acid polyvalent metal salts such as zinc stearate, aluminum stearate, calcium stearate, and zinc oleate, for example. In addition, if necessary, various auxiliary agents such as oil repellents, defoaming agents, and viscosity control agents may be added to the heat-sensitive recording layer within a range that does not diminish the effect of the present invention.

Further, microcapsules encapsulating an ultraviolet absorber or solid dispersed fine particles of an ultraviolet absorber may be contained in the heat-sensitive recording layer so as to dramatically enhance the light resistance.

Specific examples of ultraviolet absorbers include salicylic acid-based ultraviolet absorbers such as phenyl salicylate, p-tert-butyl phenyl salicylate, and p-octyl phenyl salicylate; and benzophenone-based ultraviolet absorbers such as 2,4-dihydroxybenzophenone, 2-hydroxy-4-octyloxybenzophenone, 2-hydroxy-4-methoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone.

Further examples include benzotriazole-based ultraviolet absorbers such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, 2-[2'-hydroxy-3'-(3",4",5",6"-tetrahydrophthalimide-methyl)-5'-methylphenyl]benzotriazole, 2-(2'-hydroxy-5'-tert-octylphenyl)benzotriazole, 2-[2'-hydroxy-3',5'-bis(α,α-dimethylbenzyl)phenyl]-2H-benzotriazole, 2-(2'-hydroxy-3'-dodecyl-5'-methylphenyl)benzotriazole, 2-[2'-hydroxy-4'-(2"-ethylhexyl)oxyphenyl]benzotriazole, and condensates of polyethylene glycol (molecular weight: approximately 300) and methyl-3-[3-tert-butyl-5-(2H-benzotriazole-2-yl)-4-hydroxyphenyl]propionate; and cyanoacrylate-based ultraviolet absorbers such as 2'-ethylhexyl-2-cyano-3,3-diphenylacrylate and ethyl-2-cyano-3,3-diphenylacrylate. Of course, the ultraviolet absorbers are not limited to these examples, and two or more types may also be used in combination as necessary.

Of these ultraviolet absorbers, benzotriazole-based ultraviolet absorbers are preferable. In particular, 2-(2'-hydroxy-5'-methylphenyl)benzotriazole, 2-(2'-hydroxy-3'-tert-butyl-5-methylphenyl)-5-chlorobenzotriazole, 2-(2'-hydroxy-3'-dodecyl-5'-methylphenyl)benzotriazole, 2-[2'-hydroxy-4'-(2''-ethylhexyl)oxyphenyl]benzotriazole, and condensates of polyethylene glycol (molecular weight: approximately 300) and methyl-3-[3-tert-butyl-5-(2H-benzotriazole-2-yl)-4-hydroxyphenyl]propionate are more preferable in that they exhibit a particularly marked light resistance-enhancing effect.

The addition ratio of microcapsules encapsulating an ultraviolet absorber or solid dispersed fine particles of an ultraviolet absorber is not particularly limited but is preferably from approximately 5 to approximately 70 mass % of the total solid content of the heat-sensitive recording layer. The addition ratio is particularly preferably adjusted to a range of approximately 15 to approximately 50 mass %. The light resistance can be enhanced by setting the addition ratio to at least 5 mass %. When the addition ratio exceeds 70 mass %, the light resistance is saturated, so it is preferable to set the addition ratio to at most approximately 70 mass % from the perspective of enhancing the recording sensitivity as well. In addition, the light resistance can be more effectively enhanced when the microcapsules encapsulating an ultraviolet absorber or solid dispersed fine particles of an ultraviolet absorber are contained in a protective layer described below than when they are contained in the heat-sensitive recording layer.

Microcapsules encapsulating an ultraviolet absorber can be prepared by various known methods and are typically prepared by a method of dissolving a solid or liquid ultraviolet absorber in an organic solvent as necessary at the normal temperature described above to obtain a core substance (oily liquid), emulsifying and dispersing the core substance in an aqueous medium, and forming a wall film comprising a polymer substance around the oily liquid droplets. Specific examples of polymer substances serving as the wall film of microcapsules include polyurethane resins, polyurea resins, polyamide resins, polyester resins, polycarbonate resins, aminoaldehyde resins, melamine resins, polystyrene resins, styrene-methacrylate copolymer resins, styrene-acrylate resins, gelatin, and polyvinyl alcohol.

The heat-sensitive recording layer in the present invention is formed by using a coating liquid for a heat-sensitive recording layer prepared by mixing pigments, binders, crosslinking agents, and other auxiliary agents as necessary using water, for example, as a dispersion medium, and using a dispersion in which a specific dye precursor, a developer, and, if necessary, an image stability enhancer, a sensitizer, or the like are dispersed together or separately, and coating and drying the support so as to cover the support or the metallic luster of the support so that the coating amount is, in terms of dry weight, preferably from approximately 2 to approximately 12 g/m$^2$, more preferably from approximately 2 to approximately 8 g/m$^2$, and even more preferably from approximately 2 to approximately 7 g/m$^2$.

In the present invention, it is preferable to provide a protective layer containing water-soluble polymer materials and pigments such as those conventionally used in known heat-sensitive recording mediums on the heat-sensitive recording layer. The materials described for the aforementioned heat-sensitive recording layer may be used as the water-soluble polymer materials and pigments. It is even more preferable to provide water resistance to the protective layer by adding a crosslinking agent at this time.

In the present invention, by containing microcapsules encapsulating an ultraviolet absorber or solid dispersed fine particles of an ultraviolet absorber in the protective layer, it is also possible to dramatically enhance the light resistance. In particular, microcapsules having a wall film comprising a polyurethane-polyurea resin or an aminoaldehyde resin have excellent heat resistance, which yields the excellent ancillary effect of fulfilling the function of an inorganic pigment added to the heat-sensitive recording layer or the protective layer for the purpose of preventing sticking to the thermal head. Moreover, the refractive index is lower than that of other microcapsules comprising wall films or ordinary pigments, and the shape is spherical, so there is no risk of inducing decreases in density caused by the diffused reflection of light, even when contained in the protective layer in large amounts, which allows them to be used preferably.

Further, by containing pigments, it is possible to prevent residue adhesion and sticking with respect to the thermal head. At least 50 ml/100 g of pigments are preferably used in terms of the amount of oil absorption of the pigments. The pigment content ratio is preferably at an amount that does not diminish the color optical density—that is, at most 50 mass % of the total solid content of the protective layer.

The protective layer is formed by coating on the heat-sensitive recording layer with a coating liquid for the protective layer prepared by using water, for example, as a dispersion medium and mixing crosslinking agents, pigments, and other auxiliary agents as necessary and drying so that the coating amount is, in terms of dry weight, preferably from approximately 0.1 to approximately 15 g/m$^2$ and more preferably from approximately 0.5 g/m$^2$ to approximately 8 g/m$^2$.

In the present invention, the heat-sensitive recording medium may also be printed with UV ink, flexographic ink, or the like. In this case, printing may be performed on the support or on the heat-sensitive recording layer, the protective layer, or the like.

In the present invention, a resin layer which is cured by an electron beam or ultraviolet rays may also be provided on the heat-sensitive recording layer or the protective layer. Examples of resins which may be cured by an electron beam are described in Japanese Unexamined Patent Publication No. S58-177392. Auxiliary agents such as non-electron beam-curable resins, pigments, defoaming agents, leveling agents, lubricants, surfactants, and plasticizers may also be added as necessary to such resins. In particular, adding pigments such as calcium carbonate or aluminum hydroxide, waxes, or lubricants such as silicon is preferable in that it is useful for preventing sticking to the thermal head.

In the present invention, in order to increase the added value of the heat-sensitive recording medium, it may be further processed so as to form a heat-sensitive recording medium imparted with even higher functionality. For example, by performing coating processing with an adhesive, a remoistening adhesive, a delayed tack adhesive, or the like on the back surface, it is possible to form adhesive paper, remoistening adhesive paper, or delayed tack paper. In particular, performing adhesion processing on a recording medium for forgery prevention according to the present invention is useful as a heat-sensitive label. In addition, it is also possible to utilize the back surface and to impart a function as heat transfer paper, ink jet recording paper, carbon-free paper, electrostatic recording paper, or xerography paper to the back surface so as to form recording paper capable of two-sided recording. Of course it is possible to provide a two-side heat-sensitive recording material. In addition, it is also possible to provide a back layer for preventing the infiltration of oil or plasticizers from the back surface of the heat-sensitive recording medium, controlling curling, and static elimination.

Any known coating method such as an air knife method, a blade method, a gravure method, a roll coater method, a spray method, a dip method, a bar method, a curtain method, a slot-die method, a slide die method, and an extrusion method may be used as the method for forming each layer described above on the support.

In the present invention, it is preferable for at least one of the layers that is formed on the support to be a layer formed by a curtain coating method. As a result, it is possible to form a layer having a uniform thickness, which makes it possible to increase the recording sensitivity or to increase the barrier properties with respect to oils, plasticizers, alcohols, or the like. A curtain coating method is a method of allowing a coating liquid to flow downward and freely drop so as to coat the support in a non-contact manner. A known method such as a slide curtain method, a couple curtain method, or a twin curtain method may be employed, and the method is not particularly limited. With the curtain coating method, it is possible to form layers having a further uniform thickness by applying multiple layers simultaneously. In the simultaneous application of multiple layers, each layer may be formed by laminating each coating liquid and then applying and drying the coating liquid, or each layer may be formed by applying the coating liquid for forming a lower layer, applying a coating liquid for forming an upper layer on the coated surface of the lower layer without drying while the coated surface of the lower layer is in a wet state, and then drying the coating liquid. In the present invention, an aspect in which multiple heat-sensitive recording layers and protective layers are applied simultaneously is preferable from the perspective of enhancing the barrier properties.

Performing smoothing treatment on the heat-sensitive recording surface using a known smoothing method such as a super calender or a soft calender has the effect of increasing the recording sensitivity thereof. The heat-sensitive recording surface may also be treated by bringing the heat-sensitive recording surface into contact with a metal roll or a flexible roll of a calender.

When the support has a metallic luster, it is thought that the first dye precursor present in a fine particle state in the heat-sensitive recording layer and the developer which reacts under heat so as to color the first dye precursor are temporarily melted by the applied energy of a thermal head or the like and once again hardened, which reduces diffused reflection in the heat-sensitive recording layer and yields a gold metal tone through the heat-sensitive recording layer. In the present invention, when the support has a metallic luster, the heat-sensitive recording layer covers the support so as to block the metallic luster of the support, but the degree to which the heat-sensitive recording layer conceals the metallic luster of the support in order for the colored image to exhibit a gold metal tone is not particularly limited. For example, it may be ordinary paper-like with a matte tone when viewed from the recording surface side, and recording may be performed while leaving a margin so as to enable the display of three colors including a gold metal tone, black as a mixed color, and white as a background. In addition, as long as the metallic luster can be visually confirmed through the heat-sensitive recording layer, recording may be performed while leaving a margin so as to enable the display of three colors including a gold metal tone, black as a mixed color, and white as a background.

In the present invention, an undercoat layer may be provided between the support and the heat-sensitive recording layer as necessary. As a result, it is possible to further increase the recording sensitivity. The undercoat layer is formed by applying a coating liquid for an undercoat layer containing at least one type of oil-absorptive pigment having an oil absorption of at least 70 ml/100 g and, in particular, approximately 80 to approximately 150 ml/100 g, hollow organic particles, and heat-expansible particles and a binder to the support and then drying the coating liquid. Here, the oil absorption is a value determined in accordance with the method described in JIS K 5101. By using a pigment with a high porosity such as silica or calcined kaolin for the undercoat layer, it is possible to increase the recording sensitivity of the heat-sensitive recording layer. In addition, containing a plastic pigment, hollow particles, a foam, and the like in the undercoat layer is effective for enhancing the recording sensitivity of the heat-sensitive recording layer formed thereon. The coated amount of the coating liquid for the undercoat layer is, in terms of dry weight, preferably from approximately 3 to approximately 20 $g/m^2$ and more preferably from approximately 4 to approximately 12 $g/m^2$.

The binder in the undercoat layer may be appropriately selected from binders that can be used in heat-sensitive recording layers. Of these binders, starch-vinyl acetate graft copolymers, polyvinyl alcohols, styrene-butadiene latexes, and the like are preferable from the perspective of enhancing the barrier properties.

EXAMPLES

The present invention will be described in further detail hereinafter using working examples, but the present invention is not limited by these working examples. Unless specified otherwise, "parts" and "%" respectively refer to "parts by mass" and "mass %". In addition, the volume average particle size of the pigments blended into the developer, the dye precursor, and protective layer was measured using a SALD-2200 laser diffraction particle size analyzer (manufactured by the Shimadzu Corporation).

Working Example 1-1

Preparation of Dye Precursor Dispersion (Ai Solution)

An Ai solution was obtained as a dye precursor which is colored to a yellow color tone by mixing 40 parts of 4-[2-(2-octyloxyphenyl)-6-phenyl-4-pyridinyl]-N,N-dimethylbenzeneamine, 40 parts of a 10% aqueous solution of polyvinyl alcohol (degree of polymerization: 500, degree of saponification: 88%), and 20 parts of water and pulverizing the mixture using a vertical sand mill (sand grinder manufactured by IMEX Co., Ltd.) so that the average particle size was 0.7 μm.

Preparation of Developer Dispersion (Bi Solution)

A Bi solution was obtained by mixing 40 parts of 4-hydroxy-4'-isopropoxydiphenylsulfone, 40 parts of a 10% aqueous solution of polyvinyl alcohol (degree of polymerization: 500, degree of saponification: 88%), and 20 parts of water and pulverizing the mixture using an Ultra Visco Mill until the volume average particle size was 1.5 μm.

Preparation of Sensitizer Dispersion (Ci Solution)

A Ci solution was obtained by mixing 40 parts of 1,2-di (3-methylphenoxy)ethane, 40 parts of a 10% aqueous solution of polyvinyl alcohol (degree of polymerization: 500, degree of saponification: 88%), and 20 parts of water and pulverizing the mixture using a vertical sand mill (sand grinder manufactured by IMEX Co., Ltd.) so that the average particle size was 1.0 µm.

Preparation of Coating Liquid for Heat-Sensitive Recording Layer

A coating liquid for a heat-sensitive recording layer was obtained by mixing and stirring a composition comprising 20 parts of the Ai solution, 5 parts of a styrene-butadiene latex (trade name: L1571, manufactured by Asahi Kasei Co., Ltd., solid content concentration: 48%), 25 parts of a 10% polyvinyl alcohol aqueous solution (trade name: Poval (registered trademark) PVA-110, manufactured by Kuraray Co., Ltd.), 23 parts of the Bi solution, 11 parts of the Ci solution, 2 parts of a 5% surfactant aqueous solution (trade name: SN Wet OT-70, manufactured by Sannopco Co., Ltd.), and 17 parts of water.

Preparation of Kaolin Dispersion (Di Solution)

A Di solution was obtained by mixing 80 parts of kaolin (trade name: UW-90 (registered trademark), manufactured by BASF Co., Ltd.), 1 part of a 40% aqueous solution of sodium polyacrylate (trade name: Alon T-50, manufactured by Toa Gosei Co., Ltd.), and 53 parts of water and pulverizing the mixture using a sand mill until the volume average particle size was 1.6 µm.

Preparation of Coating Liquid for Protective Layer

A coating liquid for a protective layer was obtained by mixing and stirring a composition comprising 25 parts of the Di solution, 50 parts of a 15% aqueous solution of acetoacetyl-modified polyvinyl alcohol (trade name: Gohsefimer (registered trademark) Z-200, manufactured by The Nippon Synthetic Chemical Industry Co., Ltd., degree of polymerization: approximately 1,000, degree of saponification: approximately 98 mol %), 7.5 parts of a paraffin wax (trade name: Hydrin P-7, manufactured by Chukyo Yushi Co., Ltd., solid content concentration: 30%), 5 parts of a 5% surfactant aqueous solution (trade name: SN Wet OT-70, manufactured by Sannopco Co., Ltd.), 0.3 parts of glyoxal (manufactured by The Nippon Synthetic Chemical Industry Co., Ltd., solid content concentration: 40%), and 12.5 parts of water.

Production of Heat-Sensitive Recording Medium

A heat-sensitive recording medium was obtained by applying the coating liquid for a heat-sensitive recording layer and the coating liquid for the protective layer on the surface of an aluminum vapor deposited paper (trade name: Alumik T, manufactured by Toppan TDK Label Co., Ltd., thickness: 50 µm) where an aluminum vapor deposition layer is provided using a Meyer bar and drying the coating liquids so that the respective coated amounts after drying were 5.5 g/m$^2$ (content of dye precursor which is colored to a yellow tone: 1.5 g/m$^2$) and 3.0 g/m$^2$, and then performing super calender treatment.

Working Example 1-2

A heat-sensitive recording medium was obtained in the same manner as in Working Example 1-1 with the exception that 4-[2-(2-butoxyphenyl)-6-phenyl-4-pyridinyl]-N,N-dimethylbenzeneamine was used instead of 4-[2-(2-octyloxyphenyl)-6-phenyl-4-pyridinyl]-N,N-dimethylbenzeneamine as the dye precursor which is colored to a yellow color tone in the preparation of the Ai solution in Working Example 1-1.

Working Example 1-3

A heat-sensitive recording medium was obtained in the same manner as in Working Example 1-1 with the exception that 1-(4-n-dodecyloxy-3-methoxyphenyl)-2-(2-quinolyl)ethylene was used instead of 4-[2-(2-octyloxyphenyl)-6-phenyl-4-pyridinyl]-N,N-dimethylbenzeneamine as the dye precursor which is colored to a yellow color tone in the preparation of the Ai solution in Working Example 1-1.

Working Example 1-4

A heat-sensitive recording medium was obtained in the same manner as in Working Example 1-1 with the exception that 4-[2-(2-hexyloxyphenyl)-6-phenyl-4-pyridinyl]-N,N-dimethylbenzeneamine was used instead of 4-[2-(2-octyloxyphenyl)-6-phenyl-4-pyridinyl]-N,N-dimethylbenzeneamine as the dye precursor which is colored to a yellow color tone in the preparation of the Ai solution in Working Example 1-1.

Working Example 1-5

A heat-sensitive recording medium was obtained in the same manner as in Working Example 1-1 with the exception that 4-[2-(2-pentyloxyphenyl)-6-phenyl-4-pyridinyl]-N,N-dimethylbenzeneamine was used instead of 4-[2-(2-octyloxyphenyl)-6-phenyl-4-pyridinyl]-N,N-dimethylbenzeneamine as the dye precursor which is colored to a yellow color tone in the preparation of the Ai solution in Working Example 1-1.

Working Example 1-6

A heat-sensitive recording medium was obtained in the same manner as in Working Example 1-1 with the exception that 4-[2,6-bis(2-butoxyphenyl)-4-pyridinyl]-N,N-dimethylbenzeneamine was used instead of 4-[2-(2-octyloxyphenyl)-6-phenyl-4-pyridinyl]-N,N-dimethylbenzeneamine as the dye precursor which is colored to a yellow color tone in the preparation of the Ai solution in Working Example 1-1.

Working Example 1-7

A heat-sensitive recording medium was obtained in the same manner as in Working Example 1-1 with the exception that 4-(2,6-diphenyl-4-pyridinyl]-N,N-dimethylbenzeneamine was used instead of 4-[2-(2-octyloxyphenyl)-6-phenyl-4-pyridinyl]-N,N-dimethylbenzeneamine as the dye precursor which is colored to a yellow color tone in the preparation of the Ai solution in Working Example 1-1.

Working Example 1-8

A heat-sensitive recording medium was obtained in the same manner as in Working Example 1-1 with the exception that the coated amount of the coating liquid for the heat-sensitive recording layer after drying was set to 2.5 g/m$^2$ (content of the dye precursor which is colored to a yellow color tone: 0.7 g/m$^2$) instead of 5.5 g/m$^2$ in the production of the heat-sensitive recording medium of Working Example 1-1.

Working Example 1-9

A heat-sensitive recording medium was obtained in the same manner as in Working Example 1-1 with the exception that the coated amount of the coating liquid for the heat-sensitive recording layer after drying was set to 4.0 g/m$^2$ (content of the dye precursor which is colored to a yellow color tone: 1.1 g/m²) instead of 5.5 g/m² in the production of the heat-sensitive recording medium of Working Example 1-1.

Working Example 1-10

A heat-sensitive recording medium was obtained in the same manner as in Working Example 1-1 with the exception that the coated amount of the coating liquid for the heat-sensitive recording layer after drying was set to 20.0 g/m² (content of the dye precursor which is colored to a yellow color tone: 5.6 g/m²) instead of 5.5 g/m² in the production of the heat-sensitive recording medium of Working Example 1-1.

Working Example 1-11

A heat-sensitive recording medium was obtained in the same manner as in Working Example 1-1 with the exception that an aluminum vapor deposited film (trade name: VM-PET, manufactured by Toray Co., Ltd., thickness: 50 μm) was used instead of aluminum vapor deposited paper as a support in the production of the heat-sensitive recording medium of Working Example 1-1.

Comparative Example 1-1

A heat-sensitive recording medium was obtained in the same manner as in Working Example 1-1 with the exception that synthetic paper not having a metallic luster (trade name: FPG-80, manufactured by the Yupo Corporation, thickness: 80 μm) was used instead of aluminum vapor deposited paper as a support in the production of the heat-sensitive recording medium of Working Example 1-1.

Comparative Example 1-2

A heat-sensitive recording medium was obtained in the same manner as in Working Example 1-1 with the exception that 3-di(n-butyl)amino-6-methyl-7-anilinofluoran, which is a dye precursor which is colored to a black color tone, was used instead of 4-[2-(2-octyloxyphenyl)-6-phenyl-4-pyridinyl]-N,N-dimethylbenzeneamine as the dye precursor which is colored to a yellow color tone in the preparation of the Ai solution in Working Example 1-1.

The following evaluations were performed for the heat-sensitive recording mediums obtained in this way. The results were as shown in Table 1.

(Color Tone)

Recording was performed under conditions with an applied energy of 0.968 mJ/dot using a simulator for heat-sensitive recording (trade name: TH-PMD, manufactured by Ohkura Electric Co., Ltd.), and the observed color tone of the recording part was evaluated visually.

(Metallic Luster)

A hot-air dryer was used to produce a burned surface which was colored under conditions with a temperature of 120° C. in the dryer, and the burned surface was observed visually and evaluated under the following criteria.
A: Strong metallic luster.
B: Metallic luster observed.
C: No metallic luster.

(Dynamic Color-Development Optical Density)

Recording was performed under conditions with an applied energy of 0.968 mJ/dot using a simulator for heat-sensitive recording (trade name: TH-PMD, manufactured by Ohkura Electric Co., Ltd.), and the Y density was measured as the color optical density of the recording part using an x-rite spectral density meter (trade name: x-rite528, manufactured by X-Rite Co., Ltd., colorimetric). In order to achieve a sufficient gold color, the color optical density is preferably 1.00 or more, more preferably 1.30 or more, and even more preferably 1.60 or more.

(Static Color-Development Starting Temperature)

The sample was developed every 10° C. in a range of 40 to 220° C. under conditions with a pressure of $9.8 \times 10^4$ Pa and a contact time of 5 seconds using a thermal tilt tester (manufactured by Toyo Seiki Co., Ltd.) and the Y density was measured as the color optical density of the recording part using an x-rite spectral density meter (trade name: x-rite528, manufactured by X-Rite Co., Ltd., colorimetric). Linear interpolation was performed between the temperatures where the color optical density sandwiched 0.2, and the temperature corresponding to a color optical density of 0.2 was determined. In order to achieve a sufficient gold color, the temperature at which the color optical density is 0.2 is preferably 50° C. or more and more preferably 60° C. or more.

(Stability of Colored Image)

Recording was performed under conditions with an applied energy of 0.968 mJ/dot using a simulator for heat-sensitive recording (trade name: TH-PMD, manufactured by Ohkura Electric Co., Ltd.), and after a heat-sensitive recording medium having the recording part was treated by leaving the medium to stand for 24 hours in an environment at 50° C. and 80% RH, the Y density of the recording part was measured using an x-rite spectral density meter (trade name: x-rite528, manufactured by X-Rite Co., Ltd., colorimetric). The residual rate of the color optical density of the recording part was determined from the following formula. The residual rate of the color optical density is preferably 50% or more, more preferably 70% or more, even more preferably 80% or more, and particularly preferably 90% or more.

Residual rate (%) of color optical density=[(color optical density after treatment)/(color optical density before treatment)]×100

(Light Resistance of Colored Image)

Recording was performed under conditions with an applied energy of 0.968 mJ/dot using a simulator for heat-sensitive recording (trade name: TH-PMD, manufactured by Ohkura Electric Co., Ltd.), and after a heat-sensitive recording layer having the recording part was subjected to irradiation treatment of 5,000 lux for 100 hours under a fluorescent lamp, the Y density of the recording part was measured using an x-rite spectral density meter (trade name: x-rite528, manufactured by X-Rite Co., Ltd., colorimetric). The residual rate of the color optical density of the recording part was determined in the same manner as in the case of the stability of the colored image described above. The residual rate of the color optical density is preferably 50% or more, more preferably 70% or more, even more preferably at least 80%, and particularly preferably 90% or more.

(Chromaticity)

Recording was performed under conditions with an applied energy of 0.968 mJ/dot using a simulator for heat-sensitive recording (trade name: TH-PMD, manufactured by Ohkura Electric Co., Ltd.), and the chromaticity b* value of the recording part was measured using an x-rite spectral density meter (trade name: x-rite528, manufactured by X-Rite Co., Ltd., colorimetric). In order to achieve a sufficient gold color, the chromaticity is preferably +50.0 or more.

TABLE 1

| | Color tone | Metallic luster | Dynamic color-development optical density | Static color-development starting temperature | Stability of colored image | Light resistance of colored image | Chromaticity |
|---|---|---|---|---|---|---|---|
| Working Example 1-1 | Gold | A | 1.69 | 68° C. | 73% | 80% | 51.84 |
| Working Example 1-2 | Gold | A | 1.76 | 69° C. | 84% | 84% | 56.57 |
| Working Example 1-3 | Light gold | B | 1.30 | 73° C. | 34% | 75% | 28.53 |
| Working Example 1-4 | Gold | A | 1.69 | 67° C. | 88% | 80% | 53.30 |
| Working Example 1-5 | Gold | A | 1.68 | 62° C. | 85% | 81% | 52.00 |
| Working Example 1-6 | Gold | A | 1.61 | 81° C. | 72% | 84% | 50.30 |
| Working Example 1-7 | Gold | A | 1.10 | 81° C. | 58% | 65% | 23.40 |
| Working Example 1-8 | Gold | B | 1.03 | 68° C. | 51% | 60% | 29.15 |
| Working Example 1-9 | Gold | A | 1.32 | 68° C. | 69% | 77% | 32.51 |
| Working Example 1-10 | Gold | A | 1.90 | 67° C. | 80% | 85% | 65.57 |
| Working Example 1-11 | Gold | A | 1.95 | 68° C. | 73% | 80% | 66.50 |
| Comparative Example 1-1 | Yellow | C | 1.79 | 68° C. | 73% | 80% | 51.84 |
| Comparative Example 1-2 | Black | C | 1.90 | 67° C. | 93% | 84% | −1.67 |

Working Example 2-1

Preparation of First Dye Precursor Dispersion (Aii Solution)

A first dye precursor dispersion (also called an Aii solution hereafter) was obtained in the form of solid dispersed fine particles as a dye precursor which is colored to a yellow color tone by mixing 40 parts of 4-[2-(2-octyloxy)phenyl-6-phenyl-4-pyridinyl]-N,N-dimethylbenzeneamine, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ld.) so that the average particle size was 0.7 μm.

Preparation of Fine Composite Particle Dispersion Containing Second Dye Precursor Dispersion (Bii Solution)

As a dye precursor which is colored to a magenta color tone, 20 parts of 3-(N-ethyl-N-isoamylamino)-7,8-benzofluoran was heated and dissolved (150° C.) in a mixed solvent comprising 9.5 parts of dicyclohexylmethane-4,4'-diisocyanate (trade name: Desmodur W, manufactured by Sumika Bayer Urethane Co., Ltd.) and 9.5 parts of m-tetramethylxylylene diisocyanate (trade name: TMXDI (registered trademark), manufactured by Nihon Cytec Industries, Inc.). This solution was gradually added to 90 parts of an aqueous solution containing 8.8 parts of polyvinyl alcohol (trade name: Poval (registered trademark) PVA-217EE, manufactured by Kuraray Co., Ltd.) and 2 parts of an ethylene oxide adduct of acetylene glycol (trade name: Olfin (registered trademark) E1010, manufactured by Nissin Chemical Co., Ltd.), and the mixture was emulsified and dispersed by stirring at a revolution speed of 10,000 rpm using a homogenizer. This emulsified dispersion was homogenized by adding an aqueous solution prepared by dissolving 50 parts of water and 1.5 parts of a polyvalent amine compound (trade name: Epomin SP-006, manufactured by Nippon Shokubai Co., Ltd.) in 13.5 parts of water. This emulsified dispersion was heated to 80° C. and subjected to a polymerization reaction for six hours to prepare fine composite particles having a volume average particle size of 0.8 μm, which were diluted with water to a solid content concentration of 25% so as to obtain a fine composite particle dispersion containing the second dye precursor (also called a Bii solution hereafter).

Preparation of Developer Dispersion (Cii Solution)

A developer dispersion (also called a Cii solution hereafter) was obtained by pulverizing a composition comprising 40 parts of 4-hydroxy-4'-isopropoxydiphenylsulfone, 40 parts of a 10% aqueous solution of polyvinyl alcohol (degree of polymerization: 500, degree of saponification: 88%), and 20 parts of water using a vertical sand mill (manufactured by IMEX Co., Ltd.) until the volume average particle size was 1.5 μm.

Preparation of Sensitizer Dispersion (Dii Solution)

A sensitizer dispersion (also called a Dii solution hereafter) was obtained by mixing 40 parts of 1,2-di(3-methylphenoxy)ethane, 40 parts of a 10% aqueous solution of polyvinyl alcohol (degree of polymerization: 500, degree of saponification: 88%), and 20 parts of water and pulverizing the mixture using a vertical sand mill (sand grinder manufactured by IMEX Co., Ltd.) so that the average particle size was 1.0 μm.

Preparation of Coating Liquid (I) for Heat-Sensitive Recording Layer

A coating liquid (I) for a heat-sensitive recording layer was obtained by mixing and stirring a composition comprising 18 parts of the Aii solution, 45 parts of the Bii solution, 90 parts of the Cii solution, 45 parts of the Dii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

Preparation of Kaolin Dispersion (Eii Solution)

A kaolin dispersion (also called an Eii solution hereafter) was obtained by mixing 80 parts of kaolin (trade name: UW-90 (registered trademark), manufactured by BASF Co., Ltd.), 1 part of a 40% aqueous solution of sodium polyacrylate (trade name: Alon T-50, manufactured by Toa Gosei Co., Ltd.), and 53 parts of water and pulverizing the mixture using a sand mill until the volume average particle size was 1.6 μm.

Preparation of Coating Liquid for Protective Layer

A coating liquid for a protective layer was obtained by mixing a composition comprising 25 parts of the Eii solution, 50 parts of a 15% aqueous solution of acetoacetyl-modified polyvinyl alcohol (trade name: Gohsefimer (registered trademark) Z-200, manufactured by The Nippon Synthetic Chemical Industry Co., Ltd., degree of polymerization: approximately 1,000, degree of saponification: approximately 98 mol %), 7.5 parts of a paraffin wax (trade name: Hydrin P-7, manufactured by Chukyo Yushi Co., Ltd., solid content concentration: 30%), 5 parts of a 5% surfactant aqueous solution (trade name: SN Wet OT-70, manufactured by Sannopco Co., Ltd.), 0.3 parts of glyoxal (manufactured by The Nippon Synthetic Chemical Industry Co., Ltd., solid content concentration: 40%), and 12.5 parts of water.

Production of Heat-Sensitive Recording Medium

A heat-sensitive recording medium was obtained by successively applying the coating liquid (I) for the heat-sensitive recording layer and the coating liquid for the protective layer on the surface of an aluminum vapor deposited film (trade name: VM-PET, manufactured by Toray Co., Ltd., thickness: 50 μm) where an aluminum vapor deposition layer is provided in this order using a Meyer bar and drying the coating liquids so that the respective coated amounts after drying were 7 g/m² and 3 g/m², and then performing super calender treatment.

Working Example 2-2

A heat-sensitive recording medium was obtained in the same manner as in Working Example 2-1 with the exception that 4-[2-(2-butoxyphenyl)-6-phenyl-4-pyridinyl]-N,N-dimethylbenzeneamine was used instead of 4-[2-(2-octyloxy-phenyl)-6-phenyl-4-pyridinyl]-N,N-dimethylbenzeneamine as the dye precursor which is colored to a yellow color tone in the preparation of the Aii solution in Working Example 2-1.

Working Example 2-3

A heat-sensitive recording medium was obtained in the same manner as in Working Example 2-1 with the exception that 3-di(n-butyl)amino-6-methyl-7-anilinofluoran, which is a dye precursor which is colored to a black color tone, was used instead of 3-(N-ethyl-N-isoamylamino)-7,8-benzofluoran, which is a dye precursor which is colored to a magenta color tone, as the second dye precursor in the preparation of the Bii solution in Working Example 2-1.

Working Example 2-4

Preparation of Coating Liquid (II) for Heat-Sensitive Recording Layer

A coating liquid (II) for a heat-sensitive recording layer was obtained by mixing a composition comprising 63 parts of the Aii solution, 90 parts of the Cii solution, 45 parts of the Dii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

Preparation of Coating Liquid (III) for Heat-Sensitive Recording Layer

A coating liquid (III) for a heat-sensitive recording layer was obtained by mixing a composition comprising 63 parts of the Bii solution, 90 parts of the Cii solution, 45 parts of the Dii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

A heat-sensitive recording medium was obtained in the same manner as in Working Example 2-1 with the exception that instead of applying the coating liquid (I) for a heat-sensitive recording layer on the surface of an aluminum vapor deposited film (trade name: VM-PET, manufactured by Toray Co., Ltd., thickness: 50 μm) where an aluminum vapor deposition layer is provided and drying the coating liquid so that the coated amount after drying was 7 g/m² in the production of the heat-sensitive recording medium of Working Example 2-1, the coating liquid (II) for a heat-sensitive recording layer and the coating liquid (III) for a heat-sensitive recording layer were successively applied in this order with a Meyer bar and then dried so that the coated amounts after drying were respectively 2 mg/m² and 5 g/m².

Working Example 2-5

A heat-sensitive recording medium was obtained in the same manner as in Working Example 2-1 with the exception that instead of applying the coating liquid (I) for a heat-sensitive recording layer on the surface of an aluminum vapor deposited film (trade name: VM-PET, manufactured by Toray Co., Ltd., thickness: 50 μm) where an aluminum vapor deposition layer is provided and drying the coating liquid so that the coated amount after drying was 7 g/m² in the production of the heat-sensitive recording medium of Working Example 2-1, the coating liquid (III) for a heat-sensitive recording layer and the coating liquid (II) for a heat-sensitive recording layer were successively applied in this order with a Meyer bar and then dried so that the coated amounts after drying were respectively 5 mg/m² and 2 g/m².

Working Example 2-6

A heat-sensitive recording medium was obtained in the same manner as in Working Example 2-1 with the exception that 4-(2,6-diphenyl-4-pyridinyl]-N,N-dimethylbenzeneamine was used instead of 4-[2-(2-octyloxy)phenyl-6-phenyl-4-pyridinyl]-N,N-dimethylbenzeneamine as the dye precursor which is colored to a yellow color tone in the preparation of the Aii solution in Working Example 2-1.

Working Example 2-7

A heat-sensitive recording medium was obtained in the same manner as in Working Example 2-1 with the exception that an aluminum vapor deposited paper (trade name: Alumik T, manufactured by Toppan TDK Label Co., Ltd., thickness: 50 µm) was used instead of aluminum vapor deposited film as a support in the production of the heat-sensitive recording medium of Working Example 2-1.

Working Example 2-8

A heat-sensitive recording medium was obtained in the same manner as in Working Example 2-1 with the exception that the coated amount of the coating liquid (I) for the heat-sensitive recording layer after drying was set to 10 g/m² instead of 7 g/m² in the production of the heat-sensitive recording medium of Working Example 2-1.

Comparative Example 2-1

A heat-sensitive recording medium was obtained in the same manner as in Working Example 2-1 with the exception that 1-(4-n-dodecyloxy-3-methoxyphenyl)-2-(2-quinolyl)ethylene was used instead of 4-[2-(2-octyloxy)phenyl-6-phenyl-4-pyridinyl]-N,N-dimethylbenzeneamine as the dye precursor which is colored to a yellow color tone in the preparation of the Aii solution in Working Example 2-1.

Comparative Example 2-2

Preparation of Second Dye Precursor Dispersion (Fii Solution)

A second dye precursor dispersion (also called an Fii solution hereafter) was obtained in the form of solid dispersed fine particles as a dye precursor which is colored to a magenta color tone by mixing 40 parts of 3-(N-ethyl-N-isoamylamino)-7,8-benzofluoran, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ltd.) so that the average particle size was 0.7 µm.

Preparation of Coating Liquid (IV) for Heat-Sensitive Recording Layer

A coating liquid (IV) for a heat-sensitive recording layer was obtained by mixing a composition comprising 18 parts of the Aii solution, 45 parts of the Fii solution, 90 parts of the Cii solution, 45 parts of the Dii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

A heat-sensitive recording medium was obtained in the same manner as in Working Example 2-1 with the exception that the coating liquid (IV) for the heat-sensitive recording layer was used instead of the coating liquid (I) for the heat-sensitive recording layer in the production of the heat-sensitive recording medium of Working Example 2-1.

The following evaluations were performed for the heat-sensitive recording mediums obtained in this way. The results were as shown in Table 2.

(Color Tone and Color Optical Density)

Recording was performed under conditions with an applied energy of 0.660 mJ/dot and 0.968 mJ/dot using a simulator for heat-sensitive recording (trade name: TH-PMD, manufactured by Ohkura Electric Co., Ltd.), and an x-rite spectral density meter (trade name: x-rite528, manufactured by X-Rite Co., Ltd., colorimetric mode) was used to measure the Y (yellow) and M (magenta) densities for a two-color heat-sensitive recording medium exhibiting a gold or red color tone and the Y and V (visual) densities for a two-color heat-sensitive recording medium exhibiting a gold or black color tone as the color optical density of the recording part. In addition, the color tone was evaluated visually.

(Color Separation Properties)

An image which was colored under the applied conditions of the color optical density described above was observed visually, and the color separation properties was evaluated under the following criteria.

A: The respective color tones are vividly recognizable.

B: The respective color tones are not vivid but are recognizable.

C: The respective color tones are not recognizable.

(Metallic Luster)

An image which was colored under the applied conditions of the color optical density described above was observed visually, and the image was evaluated under the following criteria.

A: Strong metallic luster.

B: Metallic luster observed.

C: No metallic luster.

TABLE 2

| | | Color optical density | | | | |
|---|---|---|---|---|---|---|
| | | 0.660 mJ/dot | | 0.968 mJ/dot | | Color | Metal- |
| | Color tone | Y | M or V | Y | M or V | separation properties | lic luster |
| Working Example 2-1 | Gold/red | 1.35 | 0.32 | 1.46 | 1.56 | A | A |
| Working Example 2-2 | Gold/red | 1.40 | 0.34 | 1.53 | 1.59 | A | A |
| Working Example 2-3 | Gold/black | 1.34 | 0.18 | 1.60 | 1.29 | A | A |
| Working Example 2-4 | Gold/red | 1.09 | 0.40 | 1.42 | 1.57 | A | A |
| Working Example 2-5 | Gold/red | 1.37 | 0.20 | 1.48 | 1.38 | A | A |
| Working Example 2-6 | Gold/red | 0.40 | 0.31 | 0.94 | 1.55 | B | A |
| Working Example 2-7 | Gold/red | 1.20 | 0.32 | 1.46 | 1.36 | A | A |
| Working Example 2-8 | Gold/red | 1.45 | 0.25 | 1.61 | 1.76 | A | A |
| Comparative Example 2-1 | Orange to red | 0.23 | 0.30 | 0.75 | 1.53 | C | C |
| Comparative Example 2-2 | Red | 1.40 | 1.38 | 1.30 | 1.75 | C | C |

Example 3-1

Preparation of First Dye Precursor Dispersion (Aiii Solution)

A first dye precursor dispersion (also called an Aiii solution hereafter) was obtained in the form of solid dispersed fine particles as a dye precursor which is colored to a yellow color tone by mixing 40 parts of 4-[2-(2-octyloxy)phenyl-6-phenyl-4-pyridinyl]-N,N-dimethylbenzeneamine, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ld.) so that the average particle size was 0.7 µm.

Preparation of Fine Composite Particle Dispersion Containing Second Dye Precursor Dispersion (B iii Solution)

As a dye precursor which is colored to a magenta color tone, 20 parts of 3-(N-ethyl-N-isoamylamino)-7,8-benzofluoran was heated and dissolved (150° C.) in a mixed solvent comprising 9.5 parts of dicyclohexylmethane-4,4'-diisocyanate (trade name: Desmodur W, manufactured by Sumika Bayer Urethane Co., Ltd.) and 9.5 parts of m-tetramethylxylylene diisocyanate (trade name: TMXDI (registered trademark), manufactured by Nihon Cytec Industries, Inc.). This solution was gradually added to 90 parts of an aqueous solution containing 8.8 parts of polyvinyl alcohol (trade name: Poval (registered trademark) PVA-217EE, manufactured by Kuraray Co., Ltd.) and 2 parts of an ethylene oxide adduct of acetylene glycol (trade name: Olfin (registered trademark) E1010, manufactured by Nissin Chemical Co., Ltd.), and the mixture was emulsified and dispersed by stirring at a revolution speed of 10,000 rpm using a homogenizer. This emulsified dispersion was homogenized by adding an aqueous solution prepared by dissolving 50 parts of water and 1.5 parts of a polyvalent amine compound (trade name: Epomin SP-006, manufactured by Nippon Shokubai Co., Ltd.) in 13.5 parts of water. This emulsified dispersion was heated to 80° C. and subjected to a polymerization reaction for six hours to prepare fine composite particles having a volume average particle size of 0.8 μm, which were diluted with water to a solid content concentration of 25% so as to obtain a fine composite particle dispersion containing the second dye precursor (also called a Biii solution hereafter).

Preparation of Developer Dispersion (Ciii Solution)

A developer dispersion (also called a Ciii solution hereafter) was obtained by pulverizing a composition comprising 40 parts of 4-hydroxy-4'-isopropoxydiphenylsulfone, 40 parts of a 10% aqueous solution of polyvinyl alcohol (degree of polymerization: 500, degree of saponification: 88%), and 20 parts of water using a vertical sand mill (manufactured by IMEX Co., Ltd.) until the volume average particle size was 1.5 μm.

Preparation of Sensitizer Dispersion (Diii Solution)

A sensitizer dispersion (also called a Diii solution hereafter) was obtained by mixing 40 parts of 1,2-di(3-methylphenoxy)ethane, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ld.) so that the average particle size was 1.0 μm.

Preparation of Coating Liquid (I) for Heat-Sensitive Recording Layer

A coating liquid (I) for a heat-sensitive recording layer was obtained by mixing a composition comprising 18 parts of the Aiii solution, 45 parts of the Biii solution, 90 parts of the Ciii solution, 45 parts of the Diii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

Preparation of Kaolin Dispersion (Eiii Solution)

A kaolin dispersion (also called an Eiii solution hereafter) was obtained by mixing 80 parts of kaolin (trade name: UW-90 (registered trademark), manufactured by BASF Co., Ltd.), 1 part of a 40% aqueous solution of sodium polyacrylate (trade name: Alon T-50, manufactured by Toa Gosei Co., Ltd.), and 53 parts of water and pulverizing the mixture using a sand mill until the volume average particle size was 1.6 μm.

Preparation of Coating Liquid for Protective Layer

A coating liquid for a protective layer was obtained by mixing a composition comprising 25 parts of the Eiii solution, 50 parts of a 15% aqueous solution of acetoacetyl-modified polyvinyl alcohol (trade name: Gohsefimer (registered trademark) Z-200, manufactured by The Nippon Synthetic Chemical Industry Co., Ltd., degree of polymerization: approximately 1,000, degree of saponification: approximately 98 mol %), 7.5 parts of a paraffin wax (trade name: Hydrin P-7, manufactured by Chukyo Yushi Co., Ltd., solid content concentration: 30%), 5 parts of a 5% surfactant aqueous solution (trade name: SN Wet OT-70, manufactured by Sannopco Co., Ltd.), 0.3 parts of glyoxal (manufactured by The Nippon Synthetic Chemical Industry Co., Ltd., solid content concentration: 40%), and 12.5 parts of water.

Production of Heat-Sensitive Recording Medium

A heat-sensitive recording medium was obtained by successively applying the coating liquid (I) for the heat-sensitive recording layer and the coating liquid for the protective layer in this order on one side of a piece of synthetic paper (trade name: FPG-80, manufactured by the Yupo Corporation, thickness: 80 μm) using a Meyer bar and drying the coating liquids so that the respective coated amounts after drying were 7 g/m$^2$ and 3 g/m$^2$, and then performing super calender treatment.

Working Example 3-2

A heat-sensitive recording medium was obtained in the same manner as in Working Example 3-1 with the exception that 4-[2-(2-butoxyphenyl)-6-phenyl-4-pyridinyl]-N,N-dimethylbenzeneamine was used instead of 4-[2-(2-octyloxyphenyl)-6-phenyl-4-pyridinyl]-N,N-dimethylbenzeneamine as the dye precursor which is colored to a yellow color tone in the preparation of the Aiii solution in Working Example 3-1.

Working Example 3-3

A heat-sensitive recording medium was obtained in the same manner as in Working Example 3-1 with the exception that 3-di(n-butyl)amino-6-methyl-7-anilinofluoran, which is a dye precursor which is colored to a black color tone, was used instead of 3-(N-ethyl-N-isoamylamino)-7,8-benzofluoran, which is a dye precursor which is colored to a magenta color tone, as the second dye precursor in the preparation of the Biii solution in Working Example 3-1.

Working Example 3-4

Preparation of Coating Liquid (II) for Heat-Sensitive Recording Layer

A coating liquid (II) for a heat-sensitive recording layer was obtained by mixing a composition comprising 63 parts of the Aiii solution, 90 parts of the Ciii solution, 45 parts of the Diii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

Preparation of Coating Liquid (III) for Heat-Sensitive Recording Layer

A coating liquid (III) for a heat-sensitive recording layer was obtained by mixing a composition comprising 63 parts of the Biii solution, 90 parts of the Ciii solution, 45 parts of the Diii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

A heat-sensitive recording medium was obtained in the same manner as in Working Example 3-1 with the exception that instead of applying the coating liquid (I) for a heat-sensitive recording layer on one side of a piece of synthetic paper (trade name: FPG-80, manufactured by the Yupo Corporation, thickness: 80 µm) and drying the coating liquid so that the coated amount after drying was 7 g/m² in the production of the heat-sensitive recording medium of Working Example 3-1, the coating liquid (II) for a heat-sensitive recording layer and the coating liquid (III) for a heat-sensitive recording layer were successively applied in this order with a Meyer bar and then dried so that the coated amounts after drying were respectively 2 mg/m² and 5 g/m².

Working Example 3-5

A heat-sensitive recording medium was obtained in the same manner as in Working Example 3-1 with the exception that instead of applying the coating liquid (I) for a heat-sensitive recording layer on one side of a piece of synthetic paper (trade name: FPG-80, manufactured by the Yupo Corporation, thickness: 80 µm) and drying the coating liquid so that the coated amount after drying was 7 g/m² in the production of the heat-sensitive recording medium of Working Example 3-1, the coating liquid (III) for a heat-sensitive recording layer and the coating liquid (II) for a heat-sensitive recording layer were successively applied in this order with a Meyer bar and then dried so that the coated amounts after drying were respectively 5 mg/m² and 2 g/m².

Working Example 3-6

A heat-sensitive recording medium was obtained in the same manner as in Working Example 3-1 with the exception that 4-(2,6-diphenyl-4-pyridinyl]-N,N-dimethylbenzeneamine was used instead of 4-[2-(2-octyloxy)phenyl-6-phenyl-4-pyridinyl]-N,N-dimethylbenzeneamine as the dye precursor which is colored to a yellow color tone in the preparation of the Aiii solution in Working Example 3-1.

Comparative Example 3-1

A heat-sensitive recording medium was obtained in the same manner as in Working Example 3-1 with the exception that 1-(4-n-dodecyloxy-3-methoxyphenyl)-2-(2-quinolyl)ethylene was used instead of 4-[2-(2-octyloxy)phenyl-6-phenyl-4-pyridinyl]-N,N-dimethylbenzeneamine as the dye precursor which is colored to a yellow color tone in the preparation of the Aiii solution in Working Example 3-1.

Comparative Example 3-2

Preparation of Second Dye Precursor Dispersion (Fiii Solution)

A second dye precursor dispersion (also called an Fiii solution hereafter) was obtained in the form of solid dispersed fine particles as a dye precursor which is colored to a magenta color tone by mixing 40 parts of 3-(N-ethyl-N-isoamylamino)-7,8-benzofluoran, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ld.) so that the average particle size was 0.7 µm.

Preparation of Coating Liquid (IV) for Heat-Sensitive Recording Layer

A coating liquid (IV) for a heat-sensitive recording layer was obtained by mixing a composition comprising 18 parts of the Aiii solution, 45 parts of the Fiii solution, 90 parts of the Ciii solution, 45 parts of the Diii solution, 20 parts of a styrene-butadiene latex (trade name: L1571, manufactured by Asahi Kasei Co., Ltd., solid content concentration: 48%), 100 parts of a 10% polyvinyl alcohol aqueous solution (trade name: Poval (registered trademark) PVA-110, manufactured by Kuraray Co., Ltd.), 10 parts of a 5% surfactant aqueous solution (trade name: SN Wet OT-70, manufactured by Sannopco Co., Ltd.), and 69 parts of water.

A heat-sensitive recording medium was obtained in the same manner as in Working Example 3-1 with the exception that the coating liquid (IV) for the heat-sensitive recording layer was used instead of the coating liquid (I) for the heat-sensitive recording layer in the production of the heat-sensitive recording medium of Working Example 3-1.

The following evaluations were performed for the heat-sensitive recording mediums obtained in this way. The results were as shown in Table 3.

(Color Tone and Color Optical Density)

Recording was performed under conditions with an applied energy of 0.660 mJ/dot and 0.968 mJ/dot using a simulator for heat-sensitive recording (trade name: TH-PMD, manufactured by Ohkura Electric Co., Ltd.), and an x-rite spectral density meter (trade name: x-rite528, manufactured by X-Rite Co., Ltd., colorimetric mode) was used to measure the Y (yellow) and M (magenta) densities for a two-color heat-sensitive recording medium exhibiting a yellow or red color tone and the Y and V (visual) densities for a two-color heat-sensitive recording medium exhibiting a yellow or black color tone as the color optical density of the recording part. In addition, the color tone was evaluated visually.

(Color Separation Properties)

An image which was colored under the applied conditions of the color optical density described above was observed visually, and the color separation properties was evaluated under the following criteria.

A: The respective color tones are vividly recognizable.
B: The respective color tones are not vivid but are recognizable.
C: The respective color tones are not recognizable.

(Color Expansibility)

A negative/positive colored image having a design in which a yellow color tone developed under the applied conditions of the color optical density described above and a different color tone than the yellow color tone are intermixed was observed visually, and the color expansibility based on the yellow color tone was evaluated under the following criteria.

A: Color expansibility is perceived strongly in the yellow colored image.
B: Color expansibility is perceived slightly in the yellow colored image.
C: No color expansibility is perceived in the yellow colored image.

(Fluorescence)

A colored image having a yellow color tone developed under the applied conditions of the color optical density described above was irradiated with ultraviolet rays of a blacklight, and it was evaluated visually whether or not the colored image emitted fluorescent light.

TABLE 3

| | | Color optical density | | | | | | |
|---|---|---|---|---|---|---|---|---|
| | | 0.660 mJ/dot | | 0.968 mJ/dot | | Color separation | Color | |
| | Color tone | Y | M or V | Y | M or V | properties | expansibility | Fluorescence |
| Working Example 3-1 | Yellow/red | 1.40 | 0.22 | 1.51 | 1.66 | A | A | Yes |
| Working Example 3-2 | Yellow/red | 1.45 | 0.24 | 1.58 | 1.69 | A | A | Yes |
| Working Example 3-3 | Yellow/black | 1.39 | 0.08 | 1.65 | 1.39 | A | A | Yes |
| Working Example 3-4 | Yellow/red | 1.15 | 0.30 | 1.48 | 1.68 | A | A | Yes |
| Working Example 3-5 | Yellow/red | 1.42 | 0.10 | 1.53 | 1.48 | A | A | Yes |
| Working Example 3-6 | Yellow/red | 0.45 | 0.21 | 0.99 | 1.65 | B | B | Yes |
| Comparative Example 3-1 | Orange to red | 0.25 | 0.20 | 0.80 | 1.63 | C | C | No |
| Comparative Example 3-2 | Red | 1.45 | 1.28 | 1.35 | 1.85 | C | C | No |

Working Example 4-1

Preparation of First Dye Precursor Dispersion (Aiv Solution)

Solid dispersed fine particles of a first dye precursor dispersion were obtained as a dye precursor which is colored to a yellow color tone by mixing 40 parts of 4-[2-(2-octyloxyphenyl)-6-phenyl-4-pyridinyl]-N,N-dimethylbenzeneamine, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ld.) so that the average particle size was 0.7 μm. The resulting dispersion is also called an Aiv solution hereafter.

Preparation of Second Dye Precursor Dispersion (Biv Solution)

Solid dispersed fine particles of a second dye precursor dispersion were obtained as a dye precursor which has a melting point of 200° C. or more and is colored to a yellow color tone by mixing 40 parts of 3-(N-ethyl-p-toluidino)-6-methyl-7-anilinofluoran, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ld.) so that the average particle size was 0.7 μm. The resulting dispersion is also called a Biv solution hereafter.

Preparation of Developer Dispersion (Civ Solution)

A developer dispersion (also called a Civ solution hereafter) was obtained by pulverizing a composition comprising 40 parts of 4-hydroxy-4'-isopropoxydiphenylsulfone, 40 parts of a 10% aqueous solution of polyvinyl alcohol (degree of polymerization: 500, degree of saponification: 88%), and 20 parts of water using a vertical sand mill (manufactured by IMEX Co., Ltd.) until the volume average particle size was 1.5 μm.

Preparation of Sensitizer Dispersion (Div Solution)

A sensitizer dispersion (also called a Div solution hereafter) was obtained by mixing 40 parts of 1,2-di(3-methylphenoxy)ethane, 40 parts of a 10% aqueous solution of polyvinyl alcohol (degree of polymerization: 500, degree of saponification: 88%), and 20 parts of water and pulverizing the mixture using a vertical sand mill (manufactured by IMEX Co., Ld.) so that the average particle size was 1.0 μm.

Preparation of Coating Liquid (I) for Heat-Sensitive Recording Layer

A coating liquid (I) for a heat-sensitive recording layer was obtained by mixing a composition comprising 20 parts of the Aiv solution, 5 parts of a styrene-butadiene latex (trade name: L1571, manufactured by Asahi Kasei Co., Ltd., solid content concentration: 48%), 25 parts of a 10% polyvinyl alcohol aqueous solution (trade name: Poval (registered trademark) PVA-110, manufactured by Kuraray Co., Ltd.), 23 parts of the Civ solution, 11 parts of the Div solution, 2 parts of a 5% surfactant aqueous solution (trade name: SN Wet OT-70, manufactured by Sannopco Co., Ltd.), and 17 parts of water.

Preparation of Coating Liquid (II) for Heat-Sensitive Recording Layer

A coating liquid (II) for a heat-sensitive recording layer was obtained by mixing a composition comprising 20 parts of the Biv solution, 5 parts of a styrene-butadiene latex (trade name: L1571, manufactured by Asahi Kasei Co., Ltd., solid content concentration: 48%), 25 parts of a 10% polyvinyl alcohol aqueous solution (trade name: Poval (registered trademark) PVA-110, manufactured by Kuraray Co., Ltd.), 23 parts of the Civ solution, 11 parts of the Div solution, 2 parts of a 5% surfactant aqueous solution (trade name: SN Wet OT-70, manufactured by Sannopco Co., Ltd.), and 17 parts of water.

Preparation of Kaolin Dispersion (Eiv Solution)

A kaolin dispersion (also called an Eiv solution hereafter) was obtained by mixing 80 parts of kaolin (trade name: UW-90 (registered trademark), manufactured by BASF Co., Ltd.), 1 part of a 40% aqueous solution of sodium polyacrylate (trade name: Alon T-50, manufactured by Toa Gosei Co., Ltd.), and 53 parts of water and pulverizing the mixture using a sand mill until the volume average particle size was 1.6 μm.

Preparation of Coating Liquid for Protective Layer

A coating liquid for a protective layer was obtained by mixing a composition comprising 25 parts of the Eiv solution, 50 parts of a 15% aqueous solution of acetoacetyl-modified polyvinyl alcohol (trade name: Gohsefimer (registered trademark) Z-200, manufactured by The Nippon Synthetic Chemical Industry Co., Ltd., degree of polymerization: approximately 1,000, degree of saponification: approximately 98 mol %), 7.5 parts of a paraffin wax (trade name: Hydrin P-7, manufactured by Chukyo Yushi Co., Ltd., solid content concentration: 30%), 5 parts of a 5% surfactant aqueous solution (trade name: SN Wet OT-70, manufactured by Sannopco Co., Ltd.), 0.3 parts of glyoxal (manufactured by The Nippon Synthetic Chemical Industry Co., Ltd., solid content concentration: 40%), and 12.5 parts of water.

Production of Heat-Sensitive Recording Medium

A heat-sensitive recording medium was obtained by successively applying the coating liquid (I) for a heat-sensitive recording layer, the coating liquid (II) for a heat-sensitive recording layer, and the coating liquid for a protective layer in this order on one side of a piece of synthetic paper (trade name: FPG-80, manufactured by Yupo Corporation, thickness: 80 µm) from the side closest to the support using a Meyer bar, drying the coating liquids so that the respective coated amounts after drying were 2.5 g/m$^2$, 4.0 g/m$^2$, and 3.0 g/m$^2$, and then performing super calendar treatment.

Working Example 4-2

A heat-sensitive recording medium was obtained in the same manner as in Working Example 4-1 with the exception that the coating liquid (II) for the heat-sensitive recording layer was applied so that the coated amount after drying was 2.5 g/m$^2$ instead of the coating liquid (II) for the heat-sensitive recording layer being applied so that the coated amount after drying was 4.0 g/m$^2$ in the production of the heat-sensitive recording medium of Working Example 4-1.

Working Example 4-3

A heat-sensitive recording medium was obtained in the same manner as in Working Example 4-1 with the exception that the coating liquid (II) for the heat-sensitive recording layer was applied so that the coated amount after drying was 4.0 g/m$^2$ instead of the coating liquid (I) for the heat-sensitive recording layer being applied so that the coated amount after drying was 2.5 g/m$^2$, and that the coating liquid (I) for the heat-sensitive recording layer was applied so that the coated amount after drying was 2.5 g/m$^2$ instead of the coating liquid (II) for the heat-sensitive recording layer being applied so that the coated amount after drying was 4.0 g/m$^2$ in the production of the heat-sensitive recording medium of Working Example 4-1.

Working Example 4-4

A heat-sensitive recording medium was obtained in the same manner as in Working Example 4-1 with the exception that 4-[2-(2-butoxyphenyl)-6-phenyl-4-pyridinyl]-N,N-dimethylbenzeneamine was used instead of 4-[2-(2-octyloxyphenyl)-6-phenyl-4-pyridinyl]-N,N-dimethylbenzeneamine as the first dye precursor in the preparation of the Aiv solution in Working Example 4-1.

Working Example 4-5

A heat-sensitive recording medium was obtained in the same manner as in Working Example 4-1 with the exception that the coating liquid (II) for the heat-sensitive recording layer was applied so that the coated amount after drying was 5.0 g/m$^2$ instead of the coating liquid (II) for the heat-sensitive recording layer being applied so that the coated amount after drying was 4.0 g/m$^2$ in the production of the heat-sensitive recording medium of Working Example 4-1.

Working Example 4-6

A heat-sensitive recording medium was obtained in the same manner as in Working Example 4-1 with the exception that the coating liquid (I) for the heat-sensitive recording layer was applied so that the coated amount after drying was 4.0 g/m$^2$ instead of the coating liquid (I) for the heat-sensitive recording layer being applied so that the coated amount after drying was 2.5 g/m$^2$, and that the coating liquid (II) for the heat-sensitive recording layer was applied so that the coated amount after drying was 2.5 g/m$^2$ instead of the coating liquid (II) for the heat-sensitive recording layer being applied so that the coated amount after drying was 4.0 g/m$^2$ in the production of the heat-sensitive recording medium of Working Example 4-1.

Working Example 4-7

A heat-sensitive recording medium was obtained in the same manner as in Working Example 4-1 with the exception that a surface of an aluminum vapor deposited film (trade name: VM-PET, manufactured by Toray Co., Ltd., thickness: 50 µm) where an aluminum vapor deposited layer was provided was used instead of the one side of the piece of synthetic paper (trade name: FPG-80, manufactured by the Yupo Corporation, thickness: 80 µm) as a support in the production of the heat-sensitive recording medium in Working Example 4-1.

Comparative Example 4-1

A heat-sensitive recording medium was obtained in the same manner as in Working Example 4-1 with the exception that 1-(4-n-dodecyloxy-3-methoxyphenyl)-2-(2-quinolyl)ethylene was used instead of 4-[2-(2-octyloxyphenyl)-6-phenyl-4-pyridinyl]-N,N-dimethylbenzeneamine as the first dye precursor in the preparation of the Aiv solution in Working Example 4-1.

Comparative Example 4-2

A heat-sensitive recording medium was obtained in the same manner as in Working Example 4-1 with the exception that 3-di(n-butyl)amino-6-methyl-7-anilinofluoran having a melting point of 182° C. was used instead of 3-(N-ethyl-p-toluidino)-6-methyl-7-anilinofluoran as the second dye precursor in the preparation of the Biv solution in Working Example 4-1.

The following evaluations were performed for the heat-sensitive recording mediums obtained in this way. The results were as shown in Table 4.

(Color Tone and Color Optical Density)

Recording was performed under conditions with an applied energy of 0.660 mJ/dot and 0.968 mJ/dot using a simulator for heat-sensitive recording (trade name: TH-PMD, manufactured by Ohkura Electric Co., Ltd.), and an x-rite spectral density meter (trade name: x-rite528, manufactured by X-Rite Co., Ltd., colorimetric mode) was used to measure the Y (yellow) and V (visual) densities as the color optical density of the recording part. In addition, the color tone was evaluated visually.

(Color Separation Properties)

An image which was colored under the applied conditions described above was observed visually, and the color separation properties was evaluated under the following criteria.
A: The respective color tones are vividly recognizable.
B: The respective color tones are recognizable.
C: The respective color tones are not recognizable.

TABLE 4

|  | Color tone | Color optical density | | | | Color separation properties |
|---|---|---|---|---|---|---|
|  |  | 0.660 mJ/dot | | 0.968 mJ/dot | | |
|  |  | Y | M or V | Y | M or V | |
| Working Example 4-1 | Yellow/black | 1.19 | 0.52 | 1.85 | 1.87 | A |
| Working Example 4-2 | Yellow/black | 1.22 | 0.32 | 1.85 | 1.30 | B |
| Working Example 4-3 | Yellow/black | 1.40 | 0.38 | 1.87 | 1.77 | B |
| Working Example 4-4 | Yellow/black | 1.23 | 0.53 | 1.88 | 1.87 | A |
| Working Example 4-5 | Yellow/black | 1.19 | 0.60 | 1.85 | 1.92 | B |
| Working Example 4-6 | Yellow/black | 1.50 | 0.31 | 1.88 | 1.20 | B |
| Working Example 4-7 | Gold/black | 1.14 | 0.47 | 1.80 | 1.82 | A |
| Comparative Example 4-1 | Dark yellow to black | 0.23 | 0.53 | 0.78 | 1.85 | C |
| Comparative Example 4-2 | Dark yellow | 1.78 | 1.75 | 1.89 | 1.88 | C |

INDUSTRIAL APPLICABILITY

When the heat-sensitive recording medium of the present invention has a metallic luster on the support, a colored image in which the observed color tone is different than the color tone of the dye precursor contained in the heat-sensitive recording layer is obtained due to the metallic luster, which makes it possible to exhibit a vivid gold metal tone. Therefore, it is possible to record variable information utilizing a vivid gold metal color tone, so the heat-sensitive recording medium can be suitably used for applications such as various tickets such as vouchers and coupons, receipts, labels, lottery tickets, sample books, price tags, baggage tags, direct mail, message cards, displays such as advertisements or billboards, and packing wrapping materials as well as a gold foil substitute.

In addition, when the heat-sensitive recording medium of the present invention is a two-color heat-sensitive recording medium, the heat-sensitive recording medium exhibits a yellow color tone and a color tone different than the yellow or color tone. The color optical density is high for each of the color tones, so the color separation properties of the recording part is excellent, and the color expanding effect is also excellent. In addition, a yellow colored image has fluorescence. Therefore, in addition to the applications described above, the heat-sensitive recording medium may also be suitably used as a warning display or reflective material for an off-limit zone or the like, for example, by selecting the color tone.

Further, by using a two-color heat-sensitive recording medium as the heat-sensitive recording medium of the present invention and imparting a metallic luster to the support, it is possible to print out variable information combining a first color tone of a gold metal tone and a second color tone that is different from the first color tone, in particular. Therefore, the heat-sensitive recording medium can be used as a decoration in combination with a red color or by selecting a negative/positive image, for example, or to display a welcome message or the like corresponding to attendees in the form of a banner or a drop curtain.

What is claimed is:

1. A heat-sensitive recording medium comprising a heat-sensitive recording layer containing a dye precursor and a developer on a support, the dye precursor being a dye precursor which is colored to a yellow color tone, wherein:
   (a) the support comprises a base material not having a metallic luster and a metallic luster on a surface of the base material, wherein a colored image exhibits a gold metal color tone;
   and/or
   (b) the dye precursor which is colored to a yellow color tone is a first dye precursor, and the heat-sensitive recording medium further contains a second dye precursor which is colored to a different color tone from the first dye precursor;
   the first dye precursor being a compound having a pyridine skeleton in a molecular structure represented by the following general formula (1):

Formula 1

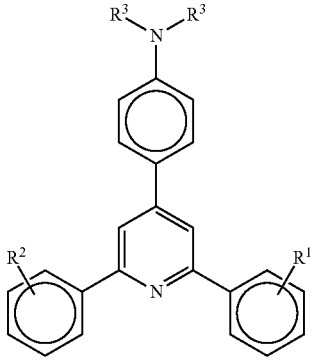

General formula (1)

(in the formula, $R^1$ and $R^2$ are hydrogen atoms or alkoxy groups having from 1 to 8 carbon atoms, wherein $R^1$ and $R^2$ may be the same or different, and $R^3$ is an alkyl group having from 1 to 4 carbon atoms);
and
the second dye precursor:
(b1) has a form of fine composite particles containing the second dye precursor and a polymer compound; or
(b2) has a melting point of 200° C. or more.

2. The heat-sensitive recording medium according to claim 1, wherein (a) the support comprises a base material not having a metallic luster and a metallic luster on a surface of the base material, wherein a colored image exhibits a gold metal color tone; and
a yellow density of dynamic coloring achieved by printing on the heat-sensitive recording medium with a thermal head at an applied energy of 0.97 mJ/dot is 1.00 or more, and a static color-development starting temperature at which a color optical density achieved by bringing the heat-sensitive recording medium into contact with a hot plate of 40 to 220° C. for 5 seconds at $9.8 \times 10^4$ Pa is 0.2 is 50° C. or more.

3. The heat-sensitive recording medium according to claim 1, wherein (a) the support comprises a base material not having a metallic luster and a metallic luster on a surface of the base material, wherein a colored image exhibits a gold metal color tone; and a content of the dye precursor which is colored to a yellow color tone is 0.7 g/m² or more.

4. The heat-sensitive recording medium according to claim 1, wherein (a) the support comprises a base material not having a metallic luster and a metallic luster on a surface of the base material, wherein a colored image exhibits a gold metal color tone; and the dye which is colored to a yellow color tone is a dye precursor having a pyridine skeleton in a molecular structure represented by the following general formula (1):

Formula 2

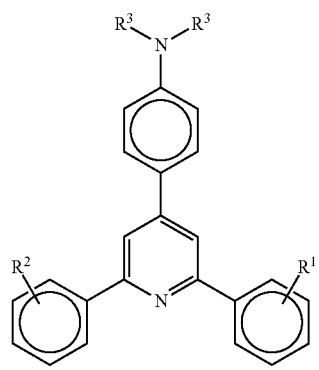

General formula (1)

(in the formula, $R^1$ and $R^2$ are hydrogen atoms or alkoxy groups having from 1 to 8 carbon atoms and may be the same or different, and $R^3$ is an alkyl group having from 1 to 4 carbon atoms).

5. The heat-sensitive recording medium according to claim 1, the heat-sensitive recording medium being a two-color heat-sensitive recording medium, wherein:

(a) the support comprises a base material not having a metallic luster and a metallic luster on a surface of the base material, wherein a colored image exhibits a gold metal color tone; and (b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the heat-sensitive recording layer has a multilayer structure comprising at least a first heat-sensitive recording layer and a second heat-sensitive recording layer, wherein the first dye precursor is contained in the first heat-sensitive recording layer, and at least the second dye precursor is contained in the second heat-sensitive recording layer in a form of fine composite particles.

6. The heat-sensitive recording medium according to claim 1, the heat-sensitive recording medium being a two-color heat-sensitive recording medium, wherein:

(a) the support comprises a base material not having a metallic luster and a metallic luster on a surface of the base material, wherein a colored image exhibits a gold metal color tone; and (b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

7. The heat-sensitive recording medium according to claim 1, the heat-sensitive recording medium being a two-color heat-sensitive recording medium, wherein:

(a) the support comprises a base material not having a metallic luster and a metallic luster on a surface of the base material, wherein a colored image exhibits a gold metal color tone; and (b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and a yellow density of dynamic coloring achieved by printing on the heat-sensitive recording medium with a thermal head at an applied energy of 0.66 mJ/dot is 1.00 or more, and a yellow density of dynamic coloring achieved by printing on the heat-sensitive recording medium with a thermal head at an applied energy of 0.97 mJ/dot is 1.00 or more.

8. The heat-sensitive recording medium according to claim 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the heat-sensitive recording layer has a multilayer structure comprising at least a first heat-sensitive recording layer and a second heat-sensitive recording layer, wherein the first dye precursor is contained in the first heat-sensitive recording layer, and at least the second dye precursor is contained in the second heat-sensitive recording layer in a form of fine composite particles.

9. The heat-sensitive recording medium according to claim 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

10. The heat-sensitive recording medium according to claim 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b1) has a form of fine composite particles containing the second dye precursor and a polymer compound; and a yellow density of dynamic coloring achieved by printing on the two-color heat-sensitive recording medium with a thermal head at an applied energy of 0.66 mJ/dot is 1.00 or more, and a yellow density of dynamic coloring achieved by printing on the two-color heat-sensitive recording medium with a thermal head at an applied energy of 0.97 mJ/dot is 1.00 or more.

11. The heat-sensitive recording medium according to claim 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and the heat-sensitive recording layer has a multilayer structure comprising at least a first heat-sensitive recording layer and a second heat-sensitive recording layer, wherein the first heat-sensitive recording layer contains the first dye precursor, and the second heat-sensitive recording layer contains the second dye precursor.

12. The heat-sensitive recording medium according to claim 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and the first dye precursor having a pyridine skeleton is at least one type selected from the group consisting of 4-[2-(2-butoxyphenyl)-6-phenyl-4-pyridinyl]-N,N-dimethylbenzeneamine, 4-[2-(2-pentyloxyphenyl)-6-phenyl-4-pyridinyl]-N,N-dimethylbenzeneamine, 4-[2-(2-hexyloxyphenyl)-6-phenyl-4-pyridinyl]-N,N-dimethylbenzeneamine, 4-[2-(2-octyloxyphenyl)-6-phenyl-4-pyridinyl]-N,N-dimethylbenzeneamine, 4-[2,6-bis(2-butoxyphenyl)-4-pyridinyl]-N,N-dimethylbenzeneamine, 4-[2,6-bis(2-pentyloxyphenyl)-4-pyridinyl]-N,N-dimethylbenzeneamine, 4-[2,6-bis(2-hexyloxyphenyl)-4-pyridinyl]-N,N-dimethylbenzeneamine, and 4-[2,6-bis(2-octyloxyphenyl)-4-pyridinyl]-N,N-dimethylbenzeneamine.

13. The heat-sensitive recording medium according to claim 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and a yellow density of dynamic coloring achieved by printing on the two-color heat-sensitive recording medium with a thermal head at an applied energy of 0.66 mJ/dot is 1.00 or more, and a yellow density of dynamic coloring achieved by printing on the two-color heat-sensitive recording medium with a thermal head at an applied energy of 0.97 mJ/dot is 1.00 or more.

14. The heat-sensitive recording medium according to claim 1, the heat-sensitive recording medium being a two-color heat-sensitive recording medium, wherein:

(b) the dye precursor which is colored to a yellow color tone is a first dye precursor, and the heat-sensitive recording medium further contains a second dye precursor which is colored to a different color tone from the first dye precursor;

the first dye precursor is a compound having a pyridine skeleton in a molecular structure represented by general formula (1);

the second dye precursor:

(b2) has a melting point of 200° C. or more; and the support has a metallic luster.

15. The heat-sensitive recording medium according to claim 1, wherein the dye precursor having a pyridine skeleton in a molecular structure represented by general formula (1) is a dye precursor excluding a case in which $R^1$ and $R^2$ are simultaneously hydrogen atoms in the formula.

* * * * *